(12) United States Patent
Futagawa

(10) Patent No.: US 7,814,081 B2
(45) Date of Patent: Oct. 12, 2010

(54) METHOD OF REDUCING COMMUNICATION CHARGE WHEN USING AN APPLICATION PROGRAM ON A PORTABLE TERMINAL

(75) Inventor: Yuki Futagawa, Tokyo (JP)

(73) Assignee: Sega Corporation, Tokyo (JP)

( * ) Notice: Subject to any disclaimer, the term of this patent is extended or adjusted under 35 U.S.C. 154(b) by 299 days.

(21) Appl. No.: 11/210,970

(22) Filed: Aug. 25, 2005

(65) Prior Publication Data

US 2006/0064421 A1 Mar. 23, 2006

(30) Foreign Application Priority Data

Sep. 21, 2004 (JP) ............................. 2004-273670

(51) Int. Cl.
 *G06F 17/00* (2006.01)
(52) U.S. Cl. ..................... 707/703; 709/227; 709/229
(58) Field of Classification Search ................. None
 See application file for complete search history.

(56) References Cited

U.S. PATENT DOCUMENTS

| 6,587,837 | B1 * | 7/2003 | Spagna et al. ................. 705/26 |
| 6,745,236 | B1 | 6/2004 | Hawkins |
| 6,800,027 | B2 * | 10/2004 | Giobbi et al. ................. 463/24 |
| 6,957,212 | B2 * | 10/2005 | Peng ............................ 707/3 |
| 7,096,004 | B2 * | 8/2006 | Minear et al. ............... 713/168 |
| 2002/0028430 | A1 * | 3/2002 | Driscoll et al. .............. 434/322 |
| 2002/0065919 | A1 | 5/2002 | Taylor |
| 2003/0013434 | A1 * | 1/2003 | Rosenberg et al. .......... 455/414 |
| 2004/0083131 | A1 * | 4/2004 | Kaufman et al. ............. 705/14 |
| 2005/0144066 | A1 * | 6/2005 | Cope et al. ................... 705/14 |

FOREIGN PATENT DOCUMENTS

| EP | 1 217 497 | A2 | 6/2002 |
| JP | 2002-196964 | A | 7/2002 |
| JP | 2002-244979 | | 8/2002 |
| JP | 2003-242106 | | 8/2003 |
| JP | 2003-275469 | A | 9/2003 |
| JP | 2004-054633 | | 2/2004 |

OTHER PUBLICATIONS

Notification of Reason for Rejection for JP 2004-273670, Feb. 2, 2010.

* cited by examiner

*Primary Examiner*—Tim T. Vo
*Assistant Examiner*—Jau-Shya Meng
(74) *Attorney, Agent, or Firm*—Dickstein Shapiro LLP

(57) ABSTRACT

A server is connected via a network to a plurality of information terminals in which predetermined application programs are executed. When the predetermined application programs are executed, the information terminals notify the server of member identifiers that identify the users. The server generates program identification numbers identifying the predetermined application programs stored in the plurality of information terminals, correlates the program identification numbers with the member identifiers, and manages each application program (program identification number manager). Then, the server verifies whether the program identification numbers transmitted from the information terminals at the time the predetermined application programs are started match program identification numbers managed in the server. If the program identification numbers do not match, the server (use request signal processor) transmits save data when the user previously terminated the application program, which save data is managed by a save data manager. If the program identification numbers match, the server transmits a match notification to the information terminal transmitting the use request signal.

12 Claims, 15 Drawing Sheets

FIG. 4A

MEMBER ID DATABASE 41

| MEMBER ID | BILLING INFORMATION |
|---|---|
| 090-0000-0000 | AUGUST 31, 2004 |
| ... | ... |

FIG. 4B

PROGRAM IDENTIFICATION NUMBER DATABASE 42

| MEMBER ID | PROGRAM IDENTIFICATION NUMBER |
|---|---|
| 090-0000-0000 | 0900000000-20040727130521 |
| ... | ... |

FIG. 4C

SAVE DATA DATABASE 43

| MEMBER ID | SAVE DATA PATH |
|---|---|
| 090-0000-0000 | 20040727130521.zip |
| ... | ... |

FIG. 8
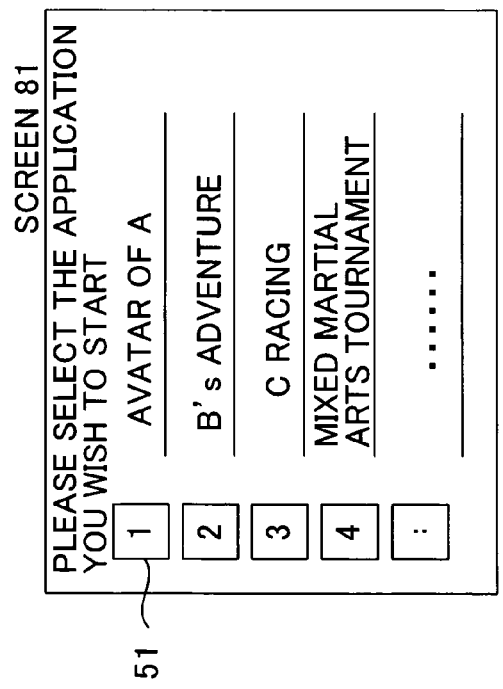
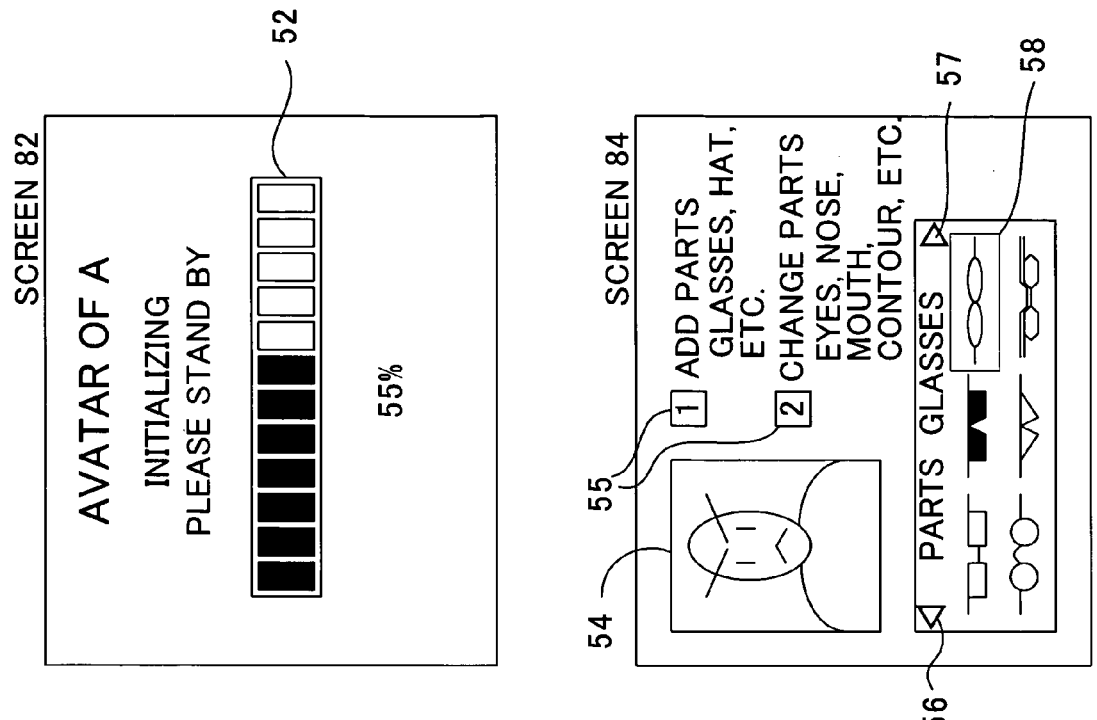
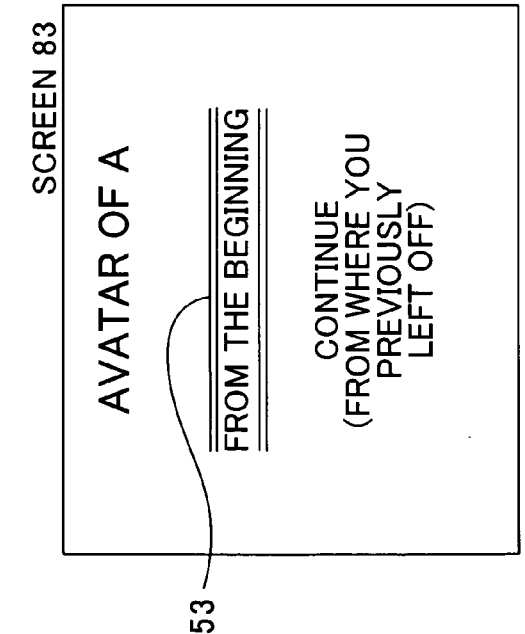
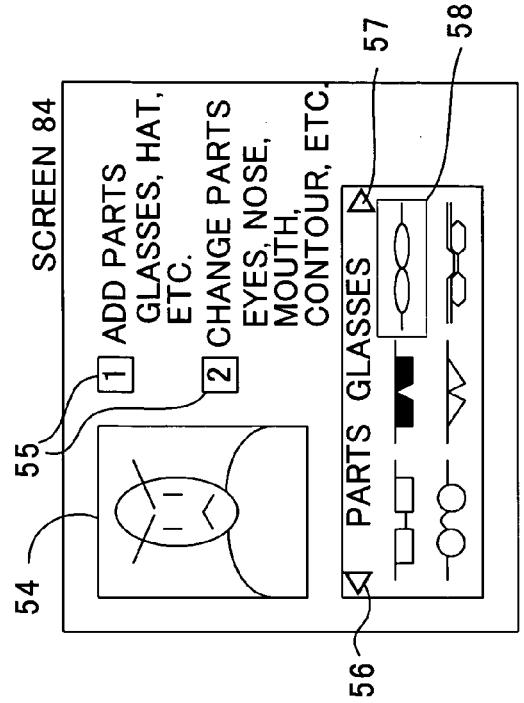

EXAMPLE OF SAVE DATA

| CHARACTER CONFIGURATION | PART NUMBER |
|---|---|
| CONTOUR | 011 |
| EYES | 021 |
| MOUTH | 033 |
| ACCESSORIES | 101, 115 |

FIG. 11B

| PURCHASE ITEM | PARTS NUMBER |
|---|---|
| GLASSES | 112, 113, 115 |
| HAT | 131, 133, 136 |
| ... | ... |

FIG. 14 ISSUANCE OF DIFFERENT PROGRAM IDENTIFICATION NUMBER AT EVERY TIME

METHOD OF REDUCING COMMUNICATION CHARGE WHEN USING AN APPLICATION PROGRAM ON A PORTABLE TERMINAL

CROSS-REFERENCE TO RELATED APPLICATIONS

This application is based upon and claims the benefit of priority from the prior Japanese Patent Application No. 2004-273670, filed on Sep. 21, 2004, the entire contents of which are incorporated herein by reference.

BACKGROUND OF THE INVENTION

1. Field of the Invention

The present invention relates to a method of reducing the communication charge that is incurred when executing an application program, esp., a network game program, on a portable terminal.

2. Description of the Related Art

Initially, video games were played individually by users using a game-dedicated terminal or a personal computer (PC) to execute a game program stored in a ROM medium (e.g., a ROM cartridge, a CD-ROM, a DVD-ROM, etc.). Thereafter, in accompaniment with the spread of the Internet, network games were introduced which many users can play at the same time by connecting, via the Internet, terminals capable of executing game programs, such as game-dedicated terminals or PCs. In recent years, environments have even come into being in which users can play network games using a portable terminal such as a portable telephone or a personal digital assistant (PDA) to execute a Java® application program or a BREW® application program.

The user can play the network game as long as the user can connect to the Internet. In other words, sometimes the terminal (game-dedicated terminal, PC, portable terminal, etc.) used by the user when playing a network game differs depending on the circumstance. For instance, sometimes the user begins playing a game on a home PC and then continues the game on a PC disposed in an Internet café or on the user's portable telephone at a destination outside of the home.

The information terminal used by the user also changes when the user changes portable telephone models. In third-generation portable telephones, consideration is being given to allow users to use the same telephone number and billing information, even if the telephone is different, by replacing the user identity module (UIM) card, and it is expected that the frequency with which users change models will increase in the future.

Thus, in order for the user to be able to continue the game that the user had been playing even when the user changes terminals, it is necessary for the save data of the user (data necessary for the progression of the network game in relation to that user; e.g., status of progress, score, list of acquired items, setting information, etc.) to be synchronized for each terminal that the user uses. This is because the save data is not always initially stored in the newly used information terminal. For example, when the user changes portable telephone models, the copyrighted contents (music, game programs, etc.) downloaded to the old portable telephone cannot as a rule be transferred to the new portable telephone with the services that mobile communications companies provide. Naturally, the save data is also not transferred.

In the prior art, several technologies have been introduced for synchronizing data between terminals. For example, an e-mail system has been proposed where a proxy server, which is provided with a terminal information database that registers terminals that are used and an e-mail list database that retains acquisition/deletion information of e-mail for the registered terminals, accesses a mail server to synchronize e-mail between the registered terminals (see Japanese Patent Application Laid-Open Publication (JP-A) No. 2002-244979). An information synchronizing method has also been proposed which, when a terminal in use is switched to non-use, allows work to be continued on a forwarding terminal by transmitting work content to an information synchronizing server, with the information synchronizing server transferring the work content to the other terminal (see JP-A Nos. 2003-242106 and 2004-54633).

With respect to network games also, similarly in the prior art, there are many instances where the save data of the user is saved to a server disposed on the Internet (e.g., a game server for processing network games, etc.). When the user continues playing, using an Internet café PC, the game that the user had been playing on the user's home PC (e.g., when an application program for network games is started), the user can pick up from where the user left off and resume the network game by acquiring the save data saved in the server.

However, in the prior art, even if the user has not changed terminals, the save data is downloaded from the server when the application program for the network game is started. It is necessary to acquire the save data from the server if the user has changed terminals, but if the user has not changed terminals, the save data only needs to be separately saved in that terminal and read.

In this manner, excessive communication has occurred in which the save data is downloaded from the server when the user has not changed terminals. Such excessive communication is not preferable for the user because an excessive monetary burden is placed on users whose communication charges are not at a fixed rate. In comparison to a PC or the like, this problem becomes particularly pronounced when the user plays a network game on a portable terminal such as a portable telephone or PDA, where the fixed-rate system of communication fees has not spread that much.

Also, sometimes the user experiences an inconvenience when the acquisition of the save data from the server is conducted during initialization when the application program is started and the time required for initialization becomes long. In comparison to a PC or the like, this problem also becomes pronounced when the user plays a network game on a portable terminal whose hardware has a low processing capability.

These problems have the potential to reduce the user's desire to play network games and distance the user. Moreover, there is the potential to place an excessive servicing burden for processing excessive communication on people who provide network games as a service.

SUMMARY OF THE PRESENT INVENTION

It is therefore an object of the present invention to provide an information providing method that can reduce communication charges by not transmitting save data to a terminal for which it is not necessary to acquire save data saved in a server, an information system used in the implementation of the information providing method, a server included in the information system, and a related program.

The above object is achieved by a first aspect of the present invention providing a server that is connected via a network to a plurality of information terminals in which predetermined application programs are executed, such that when the predetermined application program is executed in one information terminal, the one information terminal notifies the server of a member identifier identifying the user of the one information terminal to thereby conduct communication, the server comprising a storage unit in which a control program is stored; and a control unit that reads the control program from the storage unit and executes the control program, wherein the control unit implements a program identification number managing function which, when the communication is executed by any of the plurality of information terminals, generates program identification numbers that identify the predetermined application programs stored in the plurality of information terminals, correlates the program identification number with the notified member identifier, stores these as a program identification number database in the storage unit, and transmits the generated program identification numbers to the information terminals executing the communication, a save request signal processing function which, when a save request signal requesting storage of save data obtained as a result of the predetermined application programs being executed is received from any of the plurality of information terminals, correlates the save data and the member identifier received together with the save request signal, and stores the save data as a save data database in the storage unit, and a use request signal processing function which, when a use request signal notified as a result of the predetermined application programs being started is received from any of the plurality of information terminals together with the member identifier and the program identification number, references the program identification number database, acquires the program identification number correlated with the received member identifier, determines whether the acquired program identification number matches the received program identification number, and if they do not match, transmits, to the information terminal transmitting the use request signal, the save data correlated in the save data database with the received member identifier, correlates the received member identifier and the received program identification number, and updates the program identification number database.

Preferably, when the control unit receives the use request signal and the member identifier without being accompanied by the program identification number, the control unit generates the program identification number, correlates the program identification number with the member identifier, stores these in the program identification number database, and transmits the generated program identification number to the information terminal transmitting the use request signal not accompanied by the program identification number. Preferably, when the save data correlated with the member identifier received together with a use request signal not accompanied by the program identification number is stored in the save data database, the control unit transmits the save data to the information terminal transmitting the use request signal not accompanied by the program identification number, correlates the generated program identification number with the member identifier received together with the use request signal not accompanied by the program identification number, and updates the program identification number database. Preferably, when the control unit receives the save request signal, the control unit generates the program identification number, correlates the program identification number with the member identifier, stores these in the program identification number database, and transmits the generated program identification number to the information terminal transmitting the save request signal.

The above object is achieved by a second aspect of the present invention providing a program operable to drive a computer that is connected via a network to a plurality of information terminals in which predetermined application programs are executed, such that when the predetermined application program is executed in one information terminal, the one information terminal notifies the computer of member identifier identifying the user of the one information terminal to thereby conduct communication, to execute the operations of when the communication is executed by any of the plurality of information terminals, generating program identification numbers that identify the predetermined application programs stored in the plurality of information terminals, correlating the program identification number with the notified member identifier, and storing these in a program identification number database; transmitting the generated program identification numbers to the information terminals executing the communication; when a save request signal requesting storage of save data obtained as a result of the predetermined application programs being executed is received from any of the plurality of information terminals, correlating the save data and the member identifier received together with the save request signal, and storing the save data in a save data database; when a use request signal notified as a result of the predetermined application programs being started is received from any of the plurality of information terminals together with the member identifier and the program identification number, referencing the program identification number database, and acquiring the program identification number correlated with the received member identifier; determining whether the acquired program identification number matches the received program identification number, and if they do not match, transmitting, to the information terminal transmitting the use request signal, the save data correlated in the save data database with the received member identifier; and correlating the received member identifier and the received program identification number, and updating the program identification number database.

The above object is achieved by a third aspect of the present invention providing an information providing method executed in a server that is connected via a network to a plurality of information terminals having predetermined application programs to be executed, such that when the predetermined application program is executed in one information terminal, the one information terminal notifies the server of a member identifier identifying the user of the one information terminal to thereby conduct communication, the method comprising the steps of when the communication is executed by any of the plurality of information terminals, generating program identification numbers that identify the predetermined application programs stored in the plurality of information terminals, correlating the program identification number with the notified member identifier, and storing these in a program identification number database; transmitting the generated program identification numbers to the information terminals executing the communication; when a save request signal requesting storage of save data obtained as a result of the predetermined application programs being executed is received from any of the plurality of information terminals, correlating the save data and the member identifier received together with the save request signal, and storing the save data in a save data database; when a use request signal notified as a result of the predetermined application programs being started is received from any of the plurality of information terminals together with the member identifier and the program identification number, referencing the program identification number database and acquiring the program identification number correlated with the received member identifier; determining whether the acquired program identification number matches the received program identification number, and if they do not match, transmitting, to the information terminal transmitting the use request signal, the save data correlated in the save data database with the received member identifier; and correlating the received member identifier and the received program identification number, and updating the program identification number database.

The above object is achieved by a fourth aspect of the present invention providing an information system including a plurality of information terminals in which predetermined application programs are executed and a server that is connected via a network to the plurality of information terminals such that when the predetermined application program is executed in one information terminal, the one information terminal notifies the server of a member identifier identifying the user of the one information terminal to thereby conduct communication, the server comprising a storage unit in which a control program is stored; and a control unit that reads the control program from the storage unit and executes the control program, wherein the control unit implements a program identification number managing function which, when the communication is executed by any of the plurality of information terminals, generates program identification numbers that identify the predetermined application programs stored in the plurality of information terminals, correlates the program identification number with the notified member identifier, stores these as a program identification number database in the storage unit, and transmits the generated program identification numbers to the information terminals executing the communication, a save request signal processing function which, when a save request signal requesting storage of save data obtained as a result of the predetermined application programs being executed is received from any of the plurality of information terminals, correlates the save data and the member identifier received together with the save request signal, and stores the save data as a save data database in the storage unit, and a use request signal processing function which, when a use request signal notified as a result of the predetermined application programs being started is received from any of the plurality of information terminals together with the member identifier and the program identification number, references the program identification number database, acquires the program identification number correlated with the received member identifier, determines whether the acquired program identification number matches the received program identification number, and if they do not match, transmits, to the information terminal transmitting the use request signal, the save data correlated in the save data database with the received member identifier, correlates the received member identifier and the received program identification number, and updates the program identification number database, and wherein the information terminal stores the program identification number received from the server in a storage unit of the information terminal, and when transmitting the user request signal, if the program identification number is stored in the storage unit of the information terminal, the information terminal notifies the server of the program identification number.

The above object is achieved by a fifth aspect of the present invention providing an information providing method executed in an information system that includes a plurality of information terminals having predetermined application programs to be executed and a server connected via a network to the plurality of information terminals such that when the predetermined application program is executed in one information terminal, the one information terminal notifies the server of a member identifier identifying the user of the one information terminal to thereby conduct communication, the method comprising the steps of when the communication is executed by any of the plurality of information terminals, the server generating program identification numbers that identify the predetermined application programs stored in the plurality of information terminals, correlating the program identification number with the notified member identifier, and storing these in a program identification number database; the server transmitting the generated program identification numbers to the information terminals executing the communication; the information terminal executing the communication storing the program identification number received from the server; any of the plurality of information terminals transmitting, to the server, a save request signal requesting storage of save data obtained as a result of the predetermined application programs being executed, the member identifier and the save data; the server correlating the member identifier and the save data received from the information terminal, and saving the save data in a save data database; any of the plurality of information terminals transmitting, to the server, a use request signal notified by the predetermined application programs being started, the member identifier and the program identification number; the server referencing the program identification number database and acquiring the program identification number correlated with the member identifier received together with the use request signal from the information terminal; the server determining whether the acquired program identification number matches the program identification number received together with the use request signal from the information terminal, and if they do not match, transmitting, to the information terminal transmitting the use request signal, save data correlated in the save data database with the member identifier received together with the use request signal; and the server correlating the member identifier received together with the use request signal with the program identification number received together with the use request signal, and updating the program identification number database.

According to the present invention, when a user changes terminals, save data for appropriately restoring the game from where the user had left off is downloaded from the server, but when the user has not changed terminals, the save data stored in the user's terminal is used and save data is not downloaded from the server. In this manner, the excessive communication that has conventionally occurred does not arise, so that a reduction in the communication charge and an optimization of the servicing burden on network service provides can be realized. Also, the time required for initialization can be shortened because excessive acquisition of save data is not conducted during initialization when the application program is started.

Also, the program identification number is not fixed and can be set to change each time the server is accessed, and the save data of the user can be appropriately managed even if the application program is copied to another information terminal per program identification number.

BRIEF DESCRIPTION OF THE DRAWINGS

The above and other objects, aspects, features and advantages of the present invention will become more apparent from the following detailed description when taken in conjunction with the accompanying drawings, in which:

FIG. 4A is a diagram showing an example of the configuration of data in a member database used in the first embodiment, FIG. 4B is a diagram showing the configuration of data in a program identification number database used in the first embodiment, and FIG. 4C is a diagram showing an example of the configuration of data in a save data database used in the first embodiment;

FIG. 8 is a diagram showing examples of screens displayed in the first embodiment;

FIGS. 10A to 10E are diagrams showing body parts, accessory parts, and corresponding parts numbers in an avatar application program;

FIGS. 11A and 11B are diagrams showing examples of the configuration of save data;

DESCRIPTION OF THE PREFERRED EMBODIMENTS

Embodiments of the present invention will now be described with reference to the accompanying drawings. It is to be noted however that the technical scope of the present invention is not limited to these embodiments but covers the invention as defined in the appended claims and equivalents thereof.

First Embodiment

Figure 1:
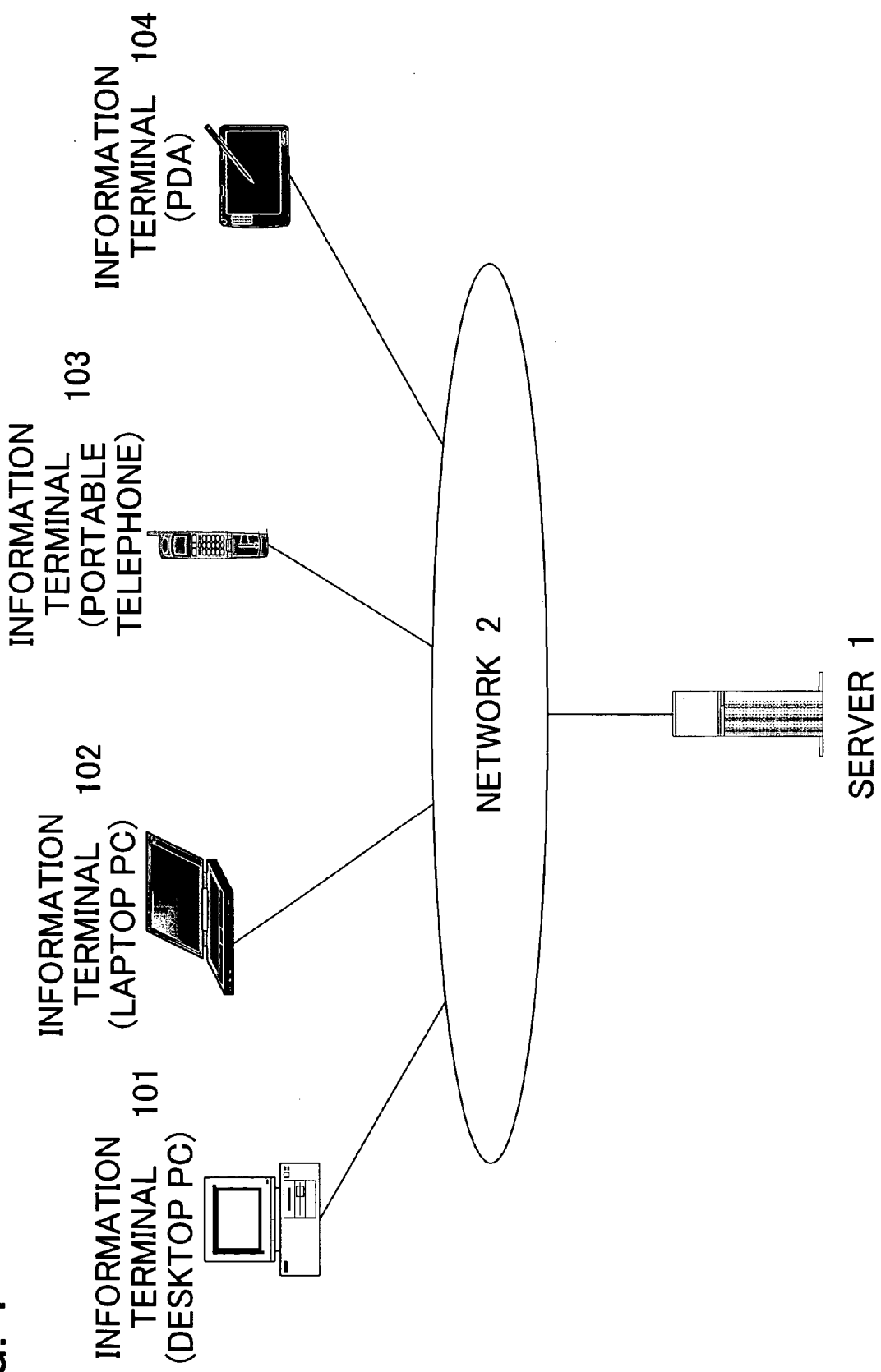
FIG. 1 is a diagram showing an example of the configuration of an information system that provides a network game service in a first embodiment of the present invention.

FIG. 1 is a diagram showing an example of the configuration of an information system that provides a network game service in a first embodiment of the present invention. The information system includes a server 1 that provides a network game service to a plurality of information terminals 101 to 104 connected to the server 1 via a network 2.

Personal information provided by the user and billing information are registered in advance in the server 1. A member database, in which member identifiers (members IDs) clearly identifying users are correlated with respect to the billing information, is stored in the server 1. Registered users log in to the server 1 via the information terminals 101 to 104 using the member IDs.

The information terminals 101 to 104 represent types of information terminals that the user can switch between. The user can play a network game by connecting a desktop PC 101, a laptop PC 102, a portable telephone 103 or a PDA 104 to the server 1 via the network 2 and executing a network game program (application program) installed in each information terminal.

The member IDs are transmitted to the server 1 from the information terminals 101 to 104, and the server 1 conducts authentication processing to determine whether the received member ID is stored in the server 1. If the member ID is stored in the server 1, the server 1 determines that the user is a registered member and allows use by the user. If the user is not a registered member, the server 1 does not allow use by the user. In the authentication processing, the server 1 may verify whether or not the use period or use limit has been exceeded on the basis of the billing information, and not allow use by the user in accordance with the result.

The server 1 provides the network game service to the information terminals in response to a request from the information terminal used by the user whose use is allowed as a member. The server 1 manages information and actions relating to information terminals that other users use, and synchronizes the information between information terminals that users logged in to a network game are using. In this manner, a plurality of users can simultaneously play a game with the same title via the server 1.

When a user terminates the game, save data is saved in the server 1. By save data is meant data relating to the progression of the game that is necessary in order for the user to resume the game (e.g., status of progress, score, list of acquired items, setting information, etc.). The saving of the save data in the server 1 may be done manually as a result of the user selecting a menu within the game or automatically by the game program as a result of the information terminal periodically (without the user's awareness) transmitting the save data to the server 1.

The save data is stored not only in the server 1 but also in the information terminal that the user is using. When the user changes terminals, the save data saved in the server 1 is downloaded to the new information terminal, and when there is no change in the terminal being used, the save data saved in the information terminal is used. In this manner, when the user wants to resume the game, one of the sets of save data is read, whereby the user can continue playing the game from where the user left off.

The network 2 may be the Internet shown in FIG. 1, or a local area network (LAN) or wide area network (WAN). In other words, the network game service provided by the server 1 may be directed towards a closed organization, such as a company or school, or the general public.

The characteristic of the present embodiment implemented in the above information system is that, in order to realize a mechanism for causing the save data to be downloaded from the server 1 when there is a change in the terminal, the server 1 issues application programs to be stored in each information terminal, and the server 1 manages the application programs with program identification numbers for which notification is given to each information terminal. An information terminal in which an application program with an issued program identification number is stored notifies the server 1 of the program identification number when accessing the server 1.

The program identification numbers issued by the server 1 are correlated with the members IDs and stored in a (program identification number) database. Here, the database stores program identification numbers when the user last accessed the server 1 via an information terminal. Then, with respect to a certain user, the server 1 compares the program identification number at the time of the last access with the program identification number notified at the time of the current access to the server 1. Thus, when the user has changed information terminals, the server 1 transmits the save data to the information terminal that the user is currently using, and when the user has not changed information terminals, the server 1 does not transmit the save data, whereby the communication charge can be reduced, initialization can be sped up, and the servicing burden on the network service provided can be appropriated.

Figure 2:
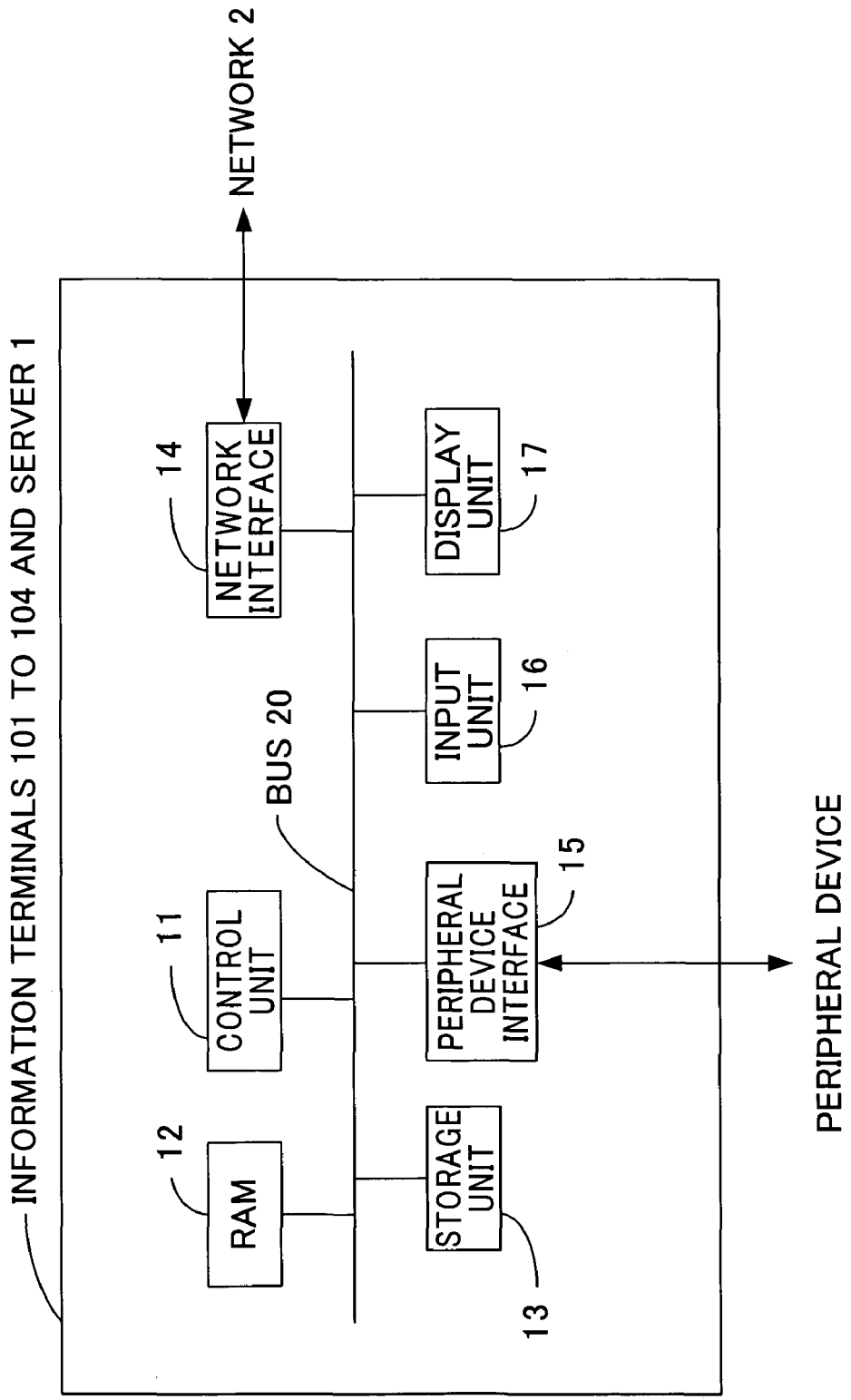
FIG. 2 is a configural block diagram of an information terminal and a server in the first embodiment.

FIG. 2 is a block diagram showing the configuration of the information terminals 101 to 104 and the server 1 in the first embodiment, and shows an example where the information terminal 102 comprises a laptop computer. The information terminal 102 in FIG. 2 includes a control unit 11, a random access memory (RAM) 12, a storage unit 13, a network interface 14, an interface 15 for connecting peripheral devices, an input unit 16, and a display unit 17.

The control unit 11 includes a central processing unit (CPU) not shown, executes RAM programs, and controls each unit included in the information terminal 102. The RAM 12 is storage means in which computations results in the processing of the information terminal 102 and programs are temporarily stored. The storage unit 13 is non-volatile storage means such as a hard disk, an optical disc, a magnetic disc, or a flash memory, and stores various data and programs such as the operating system (OS) before they are read to the RAM.

The peripheral device interface 15 is an interface for connecting peripheral devices to the information terminal 102, and comprises a universal serial bus (USB) port or a PCI card slot. Examples of the peripheral devices include a broad range of devices, such as printers, television tuners, small computer system interface (SCSI) devices, audio devices, memory card readers/writers, network cards, wireless LAN cards, and modem cards. Although the information terminal 102 here comprises a laptop PC provided with the input unit 106 and the display unit 107, a USB mouse, or even a projector or display used in a presentation, may also be externally connected to the information terminal 102 via the peripheral device interface 15.

Signals or data to be transmitted and received via the network 2 are wirelessly or wiredly inputted to the network interface 14. The network interface 14 may be omitted if the information terminal 102 is provided with a communication card externally connected via the peripheral device interface 15, such as a network card, a wireless LAN card, or a modem card.

The input unit 16 is an input device such as a keyboard, mouse, touch panel or button that inputs, to the information terminal 102, input signals of instructions (commands) from the user. The display unit 17 is a display device such as a liquid crystal display or cathode ray tube (CRT) for displaying information with respect to the user.

The laptop PC 102 of the information terminals was described above, but the configurations of the portable telephone 103 and the PDA 104 are the same as shown in FIG. 2. Other information terminals (e.g., the desktop PC 101) and the server 1 differ in that the input unit 16 such as a keyboard and the display unit 17 such as a liquid crystal display or CRT may be externally connected via the peripheral device interface 15, but the remaining configuration is the same as shown in FIG. 2. The peripheral devices may be wirelessly or wiredly connected to the information terminal via the peripheral device interface 15.

Figure 3:
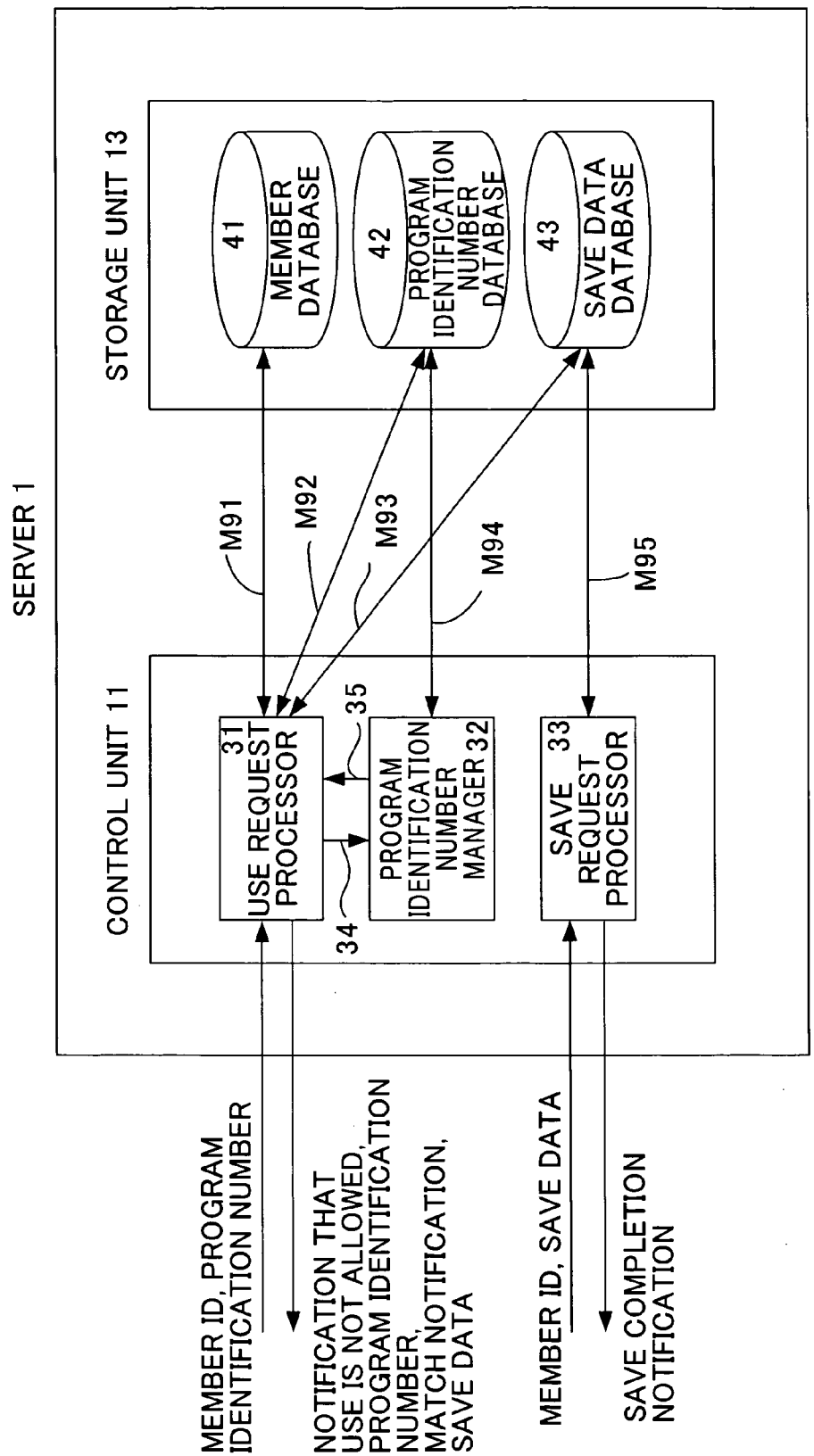
FIG. 3 is a functional block diagram describing a control unit in the server in the first embodiment.

FIG. 3 is a functional block diagram describing the control unit 11 in the server 1 in the first embodiment. The control unit 11 includes a use request signal processor 31, a program identification number manager 32, and a save request signal processor 33. The storage unit 13 of the server 1 includes a member database 41, a program identification number database 42, and a save data database 43. The member database 41 stores personal information of users registered for the network game service, member IDs that identify members, and billing information. The program identification number database 42 correlates and stores, with member IDs, program identification numbers that the server 1 uses to manage the application programs stored in the information terminals. The save data database 43 stores save data for each member.

The use request signal processor 31 processes signals (use request signals) from member users requesting use of the server 1. The use request signals are transmitted to the server 1 when the information terminals start the network game program. If a program identification number has been issued with respect to the network game program stored in the information terminal, the information terminal transmits the program identification number and the member ID to the server 1. If a program identification number has not been issued with respect to the network game program stored in the information terminal, the information terminal transmits the member ID together with a use request signal to the server 1.

When the use request signal processor 31 receives the use request signals and the member IDs from the information terminals 101 to 104 via the network 2, the use request signal processor 31 references the member database 41 to verify whether the user accessing the server 1 is a member (M91). At this time, the server 1 may confirm, on the basis of the billing information, whether or not the user has exceeded the user's use period or use limit, and not allow use by the user in accordance with the result. If it is determined as a result of this authentication that the user is not a member or that the user's use period has expired, the server 1 transmits a notification that use is not allowed to the information terminal transmitting the use request signal.

When the use request signal processor 31 receives a use request signal, the use request signal processor 31 alters its processing in accordance with whether a program identification number has been received together with the use request signal. If a program identification number has been issued with respect to the network game program stored in the information terminal, the server 1 is notified of the program identification number when the information terminal transmits the use request signal. Thus, if a program identification number does not accompany the use request signal, this means that a program identification number has not been issued with respect to the network game program stored in the information terminal that the user is using (and which has transmitted the use request signal). Hence, when the use request signal processor 31 does not receive a program identification number when it receives a use request signal, the use request signal processor 31 outputs, to the program identification number manager 32, a number issuance command 34 requesting the issuance of a program identification number and the member ID that the use request signal processor 31 received together with the use request signal.

When the number issuance command 34 is inputted to the program identification number manager 32, the program identification number manager 32 generates a program identification number (35), so that different numbers are given to the network game programs stored in the information terminals, correlates the program identification number with the inputted member ID, and stores these in the program identification number database 42 (M94). Then, the program identification number manager 32 outputs the generated program identification number 35 to the use request signal processor 31. The use request signal processor 31 transmits the generated identification number to the information terminal transmitting the use request signal.

Next, description will be given of a case where the use request signal processor 31 receives a program identification number together with the use request signal. In this case, the server 1 determines whether or not the user has changed terminals on the basis of the program identification number. In the program identification number database 42 of the first embodiment, the program identification number correlated with a certain member ID is a program identification number when save data was last transmitted, or a program identification number that was last issued, to the information terminal used by the user corresponding to the member ID (the reason for this will be described later).

Thus, if the program identification number received together with the use request signal matches, in the program identification number database 42, the program identification number correlated with the member ID of the user of the information terminal transmitting the use request signal, then there is no change in the information terminal used by the user. Thus, the use request signal processor 31 references the program identification number database 42 to determine if there is a match (M92). If there is a match, there is no need for the server 1 to transmit the save data, and the server 1 transmits a match notification to the information terminal transmitting the use request signal, and the user may immediately begin playing the network game on the information terminal.

If there is no match, the use request signal processor 31 verifies whether save data correlated with the member ID of the user of the information terminal transmitting the use request signal is stored in the save data database 43 (M93), and if it is stored, the use request signal processor 31 transmits the save data to the information terminal transmitting the use request signal. In the case where there is no match, the user has changed terminals, and the save data saved in the server 1 becomes necessary in the new terminal in order for the user to resume the network game from where the user left off.

When the use request signal processor 31 transmits the save data, it overwrites, with the program identification number received together with the use request signal, and in the program identification number database 42, the program identification number correlated with the member ID of the user of the information terminal transmitting the use request signal, and updates the program identification number database (M92). In this manner, due to the operation paths M92 and M94 to the program identification number database 42, in the program identification number database 42, the program identification number correlated with a certain member ID is the program identification number when save data was last transmitted, or the program identification number that was last issued, to the information terminal used by the user corresponding to that member ID.

Even assuming that there is no match, there are also instances where the save data correlated with the member ID of the user using the information terminal transmitting the use request signal is not stored in the save data database 43. This is an instance where the user first begins using the network game. In this case, it is not necessary for the server 1 to transmit save data, so the server 1 notifies the information terminal transmitting the use request signal that there is no save data, and the user may immediately begin playing the network game on the information terminal.

The save request signal processor 33 processes a request (save request signal) from the user to save the save data in the server 1. There are cases where the save request signal is manually transmitted by the user and cases where the save request signal is automatically transmitted by the game program. In either case, the processing is the same.

The save request signal processor 33 correlates the save data with the member ID (representing the user using the information terminal transmitting the save request signal) received together with the save request signal, and stores the save data in the save data database 43 (M95). Then, after saving the save data, the save request signal processor 33 transmits a save completion notification to the information terminal transmitting the save request signal.

It will be noted that each of the functional units in FIG. 3 can be realized by hardware or as a program that is executed by the CPU not shown disposed in the control unit 11. When the functional units are realized by hardware, it is not invariably necessary for them to be included in the control unit 11.

FIGS. 4A to 4C are diagrams showing examples of the configurations of data in the member database 41, the program identification number database 42 and the save data database 43 used in the first embodiment. The examples of the configurations of data shown in FIGS. 4A to 4C are examples when the portable telephone 103 is used as the information terminal.

Portable telephones are ordinarily used by individual subscribers, and users who are subscribers can be clearly identified by identifying the telephone number allocated to the portable telephone. In other words, portable telephone numbers can be used as member IDs. Thus, in FIGS. 4A to 4C, users are identified using portable telephone numbers as member IDs.

FIG. 4A is a diagram showing an example of the configuration of data in the member database 41. Entries for member users are included in the member database 41 of FIG. 4A, and each entry includes the data items of "member ID" and "billing information." The "member ID" is an identifier that clearly identifies a member user. Here, as mentioned previously, portable telephone numbers are used.

The "billing information" represents the period in which a user can receive the network game service in accordance with the billing status of the user. For example, in FIG. 4A, a setting is shown where a user whose member ID is "090-0000-0000" can use the network game until Aug. 31, 2004. Additionally, the remaining time that the user can use the network game, the upper limit of the amount of money, and the remaining money may also be stored as the billing information. Other items that may be included in the member database 41 include "personal information," in which are stored names, addresses, ages, home telephone numbers and portable telephone numbers, "passwords" for bolstering authentication, and "remarks," in which is stored remark information.

FIG. 4B is a diagram showing an example of the configuration of data in the program identification number database 42. Entries for member users are included in the program identification number database 42 of FIG. 4B, and each entry includes the data items of "member ID" and "program identification number." The "member ID" here is the same as the "member ID" of FIG. 4A.

The "program identification number" is a program identification number that the server 1 issues in order to identify the network game programs stored in each information terminal. Here, the program identification number is formed, with the member ID, incorporating the date on which the program identification number was generated.

For instance, in "09000000000-20040727130521" shown in FIG. 4B, the portion in front of the hyphen symbol is the member ID inputted to the program identification number manager 32 together with the number issuance command 34, and the portion after the hyphen symbol indicates that the program identification number was issued on Jul. 27, 2004, at 13:05:21. By assigning these numbers, the network game programs stored in the information terminals can be prevented from having the same program identification numbers. Additionally, each network game program can be clearly identified by its program identification number.

FIG. 4C is a diagram showing an example of the configuration of data in the save data database 43. Entries for member users are included in the save data database 43 of FIG. 4C, and each entry includes the data items of "member ID" and "save data path." The "member ID" here is the same as the "member ID" of FIG. 4A.

The "save data path" is a file path or folder path that identifies the position in the storage unit 13 of the server 1 in which the save data is stored. In the example shown in FIG. 4C, the save data of the user whose member ID is "090-0000-0000" is stored in a compressed file called "20040727130521.zip" of the current directory. In FIG. 4C, only the file name is shown, but if a predetermined folder is to be used for the save data, then the "save data path" may be designated by an absolute path (e.g., "\savadata\20040727130521.zip") or a relative path (e.g., " . . . \savadata\20040727130521.zip").

Next, the operation of the server 1 in the first embodiment will be described using a flow chart.

Figure 5:
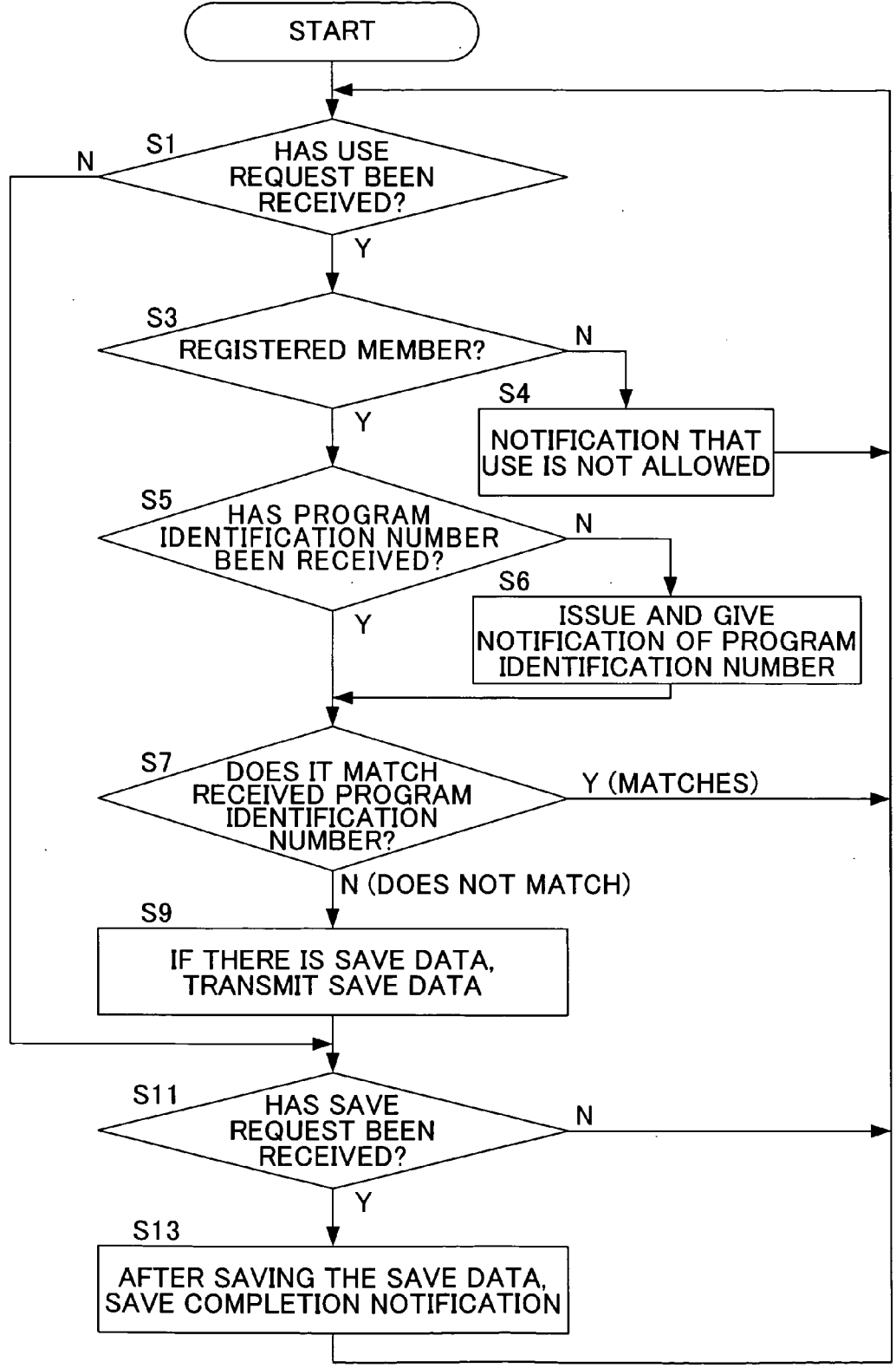
FIG. 5 is a flow chart describing the operation of the server in the first embodiment.

FIG. 5 is a flow chart describing the operation of the server 1 in the first embodiment. The server 1 of the first embodiment conducts processing in accordance with use request signals and save request signals transmitted from the information terminals. First, the server 1 determines whether that which has been received is a use request signal or a save request signal (S1). If the received signal is not a use request signal (S1: NO), then the received signal is a save request signal, so the processing proceeds to step S11, where save request signal processing is conducted (described later).

If the received signal is a use request signal (S1: YES), then the server 1 determines whether the user using the information terminal transmitting the use request signal is a registered member who is allowed to play the network game (S3). When the information terminal transmits the use request signal to the server 1, the information terminal notifies the server 1 at least of the member ID. Thus, in step S3, the use request signal processor 31 references the member database 41 to verify that the received member ID is stored therein.

Here, when portable telephone numbers are used as the member IDs, for example, it is determined if the notified portable telephone number is stored in the member database 41. If the received member ID is not stored in the member database 41 (S3: NO), then the server 1 regards the access as access by a non-member user, and the use request signal processor 31 transmits a notification that use is not allowed to the information terminal transmitting the use request signal (S4) and waits for the arrival of a new use request signal or save request signal.

It will be noted that in step S3, the use request signal processor 31 can conduct additional authentication processing using the data items stored in the member database 41. For example, the use request signal processor 31 can verify whether or not the use period has been exceeded on the basis of the billing information, and transmit a notification that use is not allowed to (information terminals used by) member users whose use period has been exceeded.

When step S3 ends, the server 1 determines if a program identification number has been received (S5). When the information terminal transmits a use request signal to the server 1, the information terminal also notifies the server 1 of the program identification number if a program identification number has already been issued to the application program stored in that information terminal.

Thus, if a program identification number is not received together with the use request signal (S5: NO), this means that a program identification number has not been issued to the network game program stored in the information terminal transmitting the use request signal. Thus, the server 1 issues a program identification number and notifies the information terminal of the program identification number (S6).

In step S6, first, the use request signal processor 31 outputs the number issuance command 34 and the member ID received together with the use request signal to the program identification number manager 32. The program identification number manager 32 generates a new program identification number in response to the number issuance command, correlates the program identification number with the member ID, stores these in the program identification number database 42, and outputs the generated program identification number 35 to the use request signal processor 31. The use request signal processor 31 then transmits the generated program identification number to the information terminal transmitting the use request signal.

When a program identification number is received together with the use request signal (S5: YES), step S6 is skipped because it is not necessary to again issue a program identification number. When step S6 is skipped (S5: YES) or step S6 ends, the server 1 determines whether the information terminal used by the user has changed on the basis of the program identification number (S7). Thus, the use request signal processor 31 verifies whether the program identification number received together with the use request signal matches the program identification number correlated in the program identification number database 42 with the member ID received together with the use request signal.

As mentioned above, in the program identification number database 42, the program identification number correlated with a certain member ID is a program identification number when save data was last transmitted, or a program identification number that was last issued, to the information terminal used by the user corresponding to that member ID, and if both match in step S7, this means that the user is using the information terminal to which the save data had been transmitted previously or that the user is using the information terminal that the user had initially used. Thus, if the program identification number received together with the use request signal matches the program identification number correlated in the program identification number database 42 with the member ID received together with the use request signal (S7: YES), then the server 1 waits for the arrival of a new use request signal or save request signal without transmitting the save data.

If the program identification number received together with the use request signal does not match the program identification number correlated in the program identification number database 42 with the member ID received together with the use request signal (S7: NO), then the server 1 transmits the save data if the user using the information terminal transmitting the use request signal has saved the save data in the server 1 in the past (S9). In step S9, the use request signal processor 31 references the save data database 43, and if save data correlated with the member ID received together with the use request signal is present, the use request signal processor 31 transmits that save data to the information terminal transmitting the use request signal.

It will be noted that when the program identification number is issued in step S6, there is no "program identification number received together with the use request signal," so the determination in step S7 automatically becomes negative (S7: NO). However, even in this case, if save data has been saved in the server 1 in the past, then that save data is transmitted. If save data has not been saved in the server 1 in the past, then step S9 is skipped.

When step S9 ends, the server 1 determines whether a save request signal has been received (S11). If a save request signal has not been received (S11: NO), then the server 1 waits for the arrival of a new use request signal or save request signal. If a save request signal has been received (S11: YES), then the server 1 saves, in the server 1, the save data of the user using the information terminal transmitting the save request signal, transmits a save completion notification after saving the save data (S13), and waits for the arrival of a new use request signal or save request signal.

When the information terminal transmits the save request signal to the server 1, the information terminal notifies the server 1 of the member ID and save data. In step S13, the save request signal processor 33 correlates, with the member ID received together with the save request signal, the save data received together with the save request signal, stores the save data in the save data database 42, thereafter transmits a save completion notification to the information terminal transmitting the save request signal, and waits for the arrival of a new use request signal or save request signal.

Next, an example of the operation of the information system in the first embodiment will be described using a flow chart and examples of screens. A case will be described here where the portable telephone 103 is used as the information terminal, the user begins playing on a certain portable telephone (terminal A), and then changes to another portable telephone (terminal B). It will be assumed that the data used has the configuration shown in FIGS. 4A to 4C. While the user is playing on terminal A, the save data is not downloaded from the server 1 at the time of startup, and excessive communication does not occur. When the user changes the information terminal being used to terminal B, the save data is downloaded from the server 1, and the user can continue playing, on terminal B, the game that the user had played on terminal A.

Figure 6:
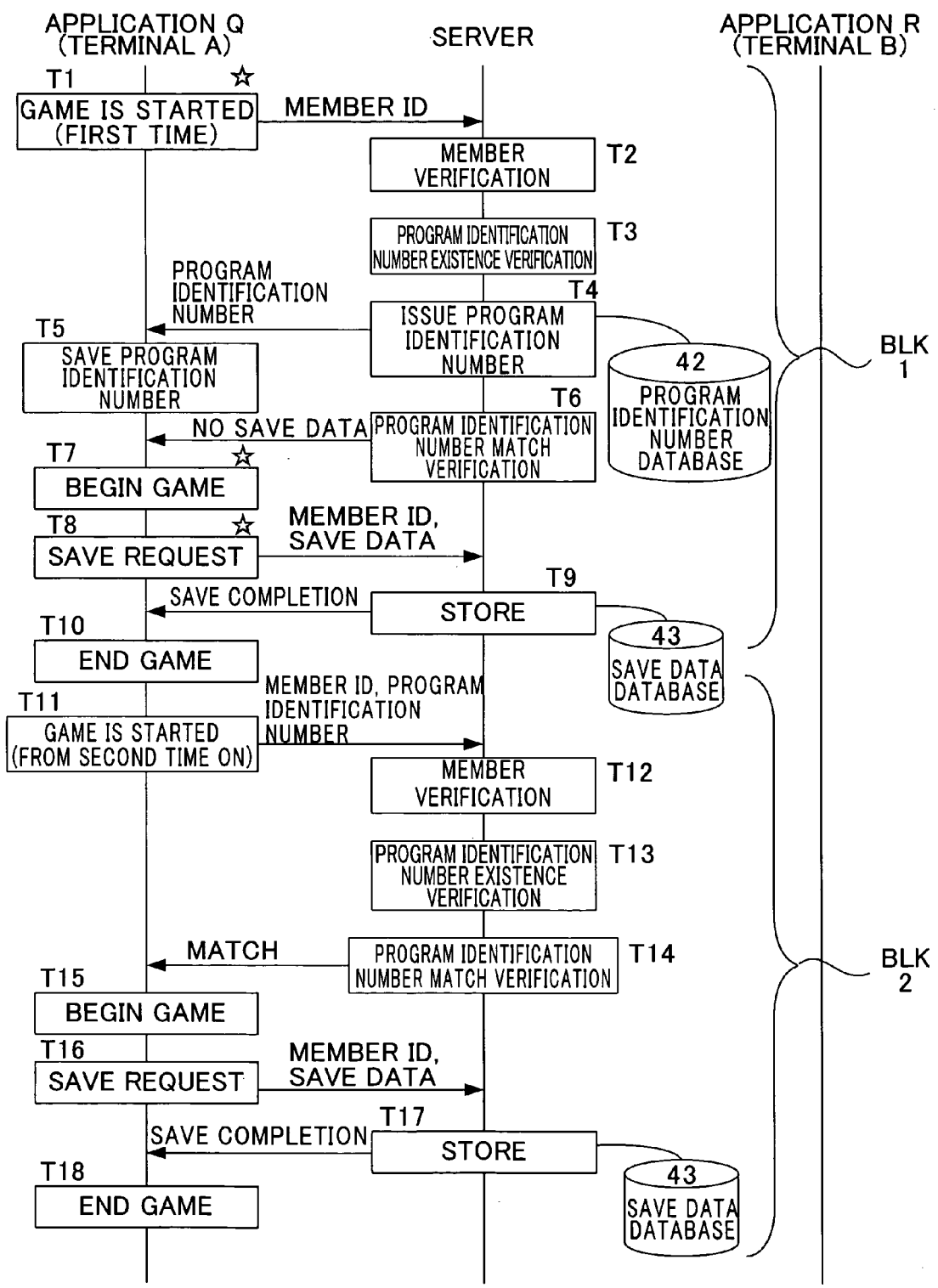
FIG. 6 is a flow chart describing the operation of the information system in the first embodiment.
Figure 7:
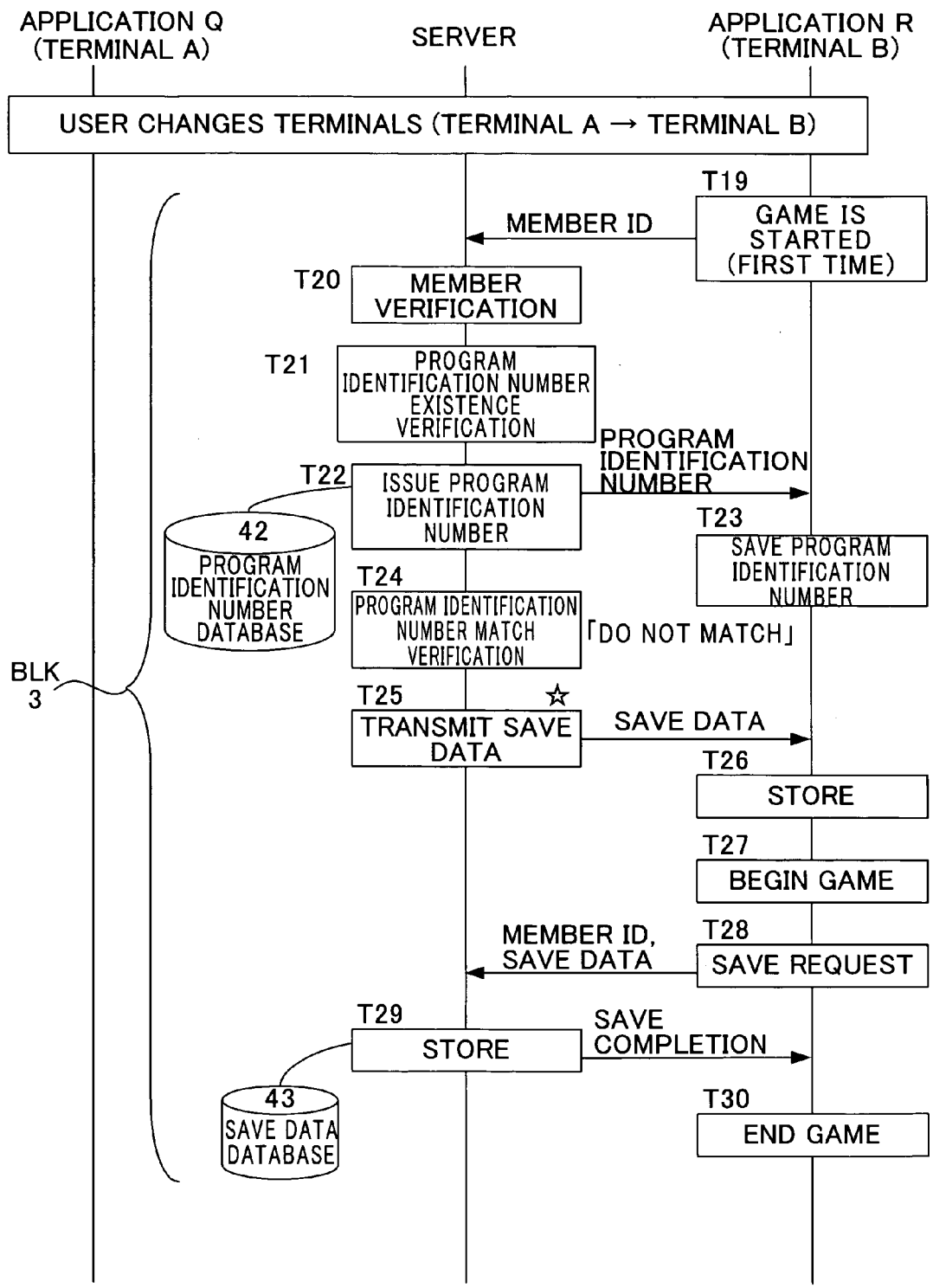
FIG. 7 is a flow chart describing the operation of the information system in the first embodiment.

FIGS. 6 and 7 are a flow chart describing the operation of the information system. The processing of the server 1 in FIGS. 6 and 7 has already been described in FIG. 5, so description will be omitted by referring to the step numbers in FIG. 5. The columnar shapes in FIGS. 6 and 7 represent databases in which writing is conducted.

Figure 9:
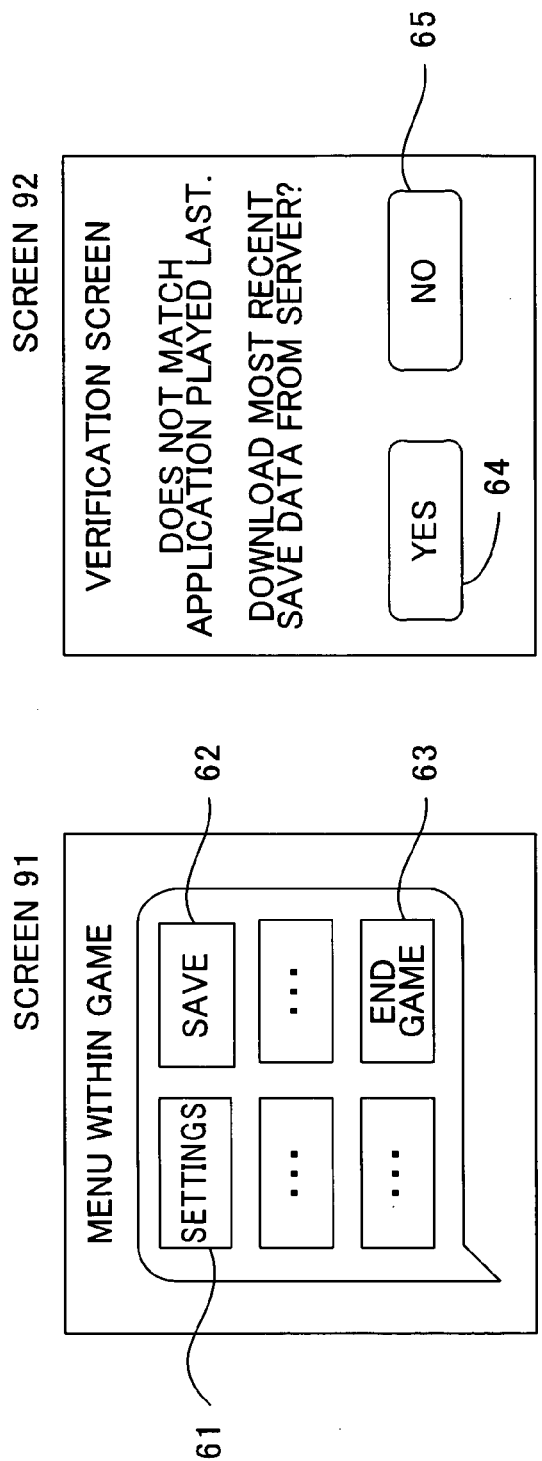
FIG. 9 is a diagram showing examples of screens displayed in the first embodiment.

FIGS. 8 and 9 show examples of screens displayed on the information terminal, and in FIGS. 6 and 7, places indicated by the star symbols correspond to the screen examples. Reference will be made to the screen examples in the description of FIGS. 6 and 7.

Here, a game called "Avatar of A" is selected as the network game, and the program for executing "Avatar of A" stored in terminal A will be called application Q below. The avatar game is one where a dress-up figure is represented as a two-dimensional image, and is interesting in that the user selects and freely combines body parts (facial contour, eyes, eyebrows, mouth, nose, etc.) and accessory parts (necklace, watch, glasses, clothes, mask, hat, etc.) to create an image of an optional character. It will be assumed that at the starting point in time in the flow chart, avatar application programs (applications Q and R) for executing the "Avatar of A" are preinstalled in terminals A and B.

First, in FIG. 6, the user starts the network game program stored in terminal A (T1). This is the first time application Q has been started, and only the member ID of the user is transmitted in step T1 because a program identification number has not been issued with respect to application Q.

Screen 81 in FIG. 8 is an example of a screen displayed on terminal A in step T1. Titles of a plurality of network games stored in terminal A are displayed, and the user selects number 51 via the input unit of the information terminal, whereby the corresponding network game program is started. Here, "Avatar of A" is selected ("1" is selected) as the network game.

Returning now to FIG. 6, when application Q is started, the server 1 conducts member verification on the basis of the member ID (T2). Step T2 corresponds to the processing of step S3 in FIG. 5. Here, it is assumed that the user is a registered member and use is allowed.

Next, the server 1 verifies whether a program identification number has been received together with the use request signal (T3). Step T3 corresponds to the processing of step S5 in FIG. 5. Because only the member ID is transmitted in step T1, here, the server 1 issues a program identification number, correlates the program identification number with the member ID in the program identification number database 42, and stores these in the program identification number database 42 (T4). Step T4 corresponds to the processing of step S5 (NO) to S6 in FIG. 5.

The program identification number issued in step T4 is transmitted to terminal A, and terminal A stores the transmitted program identification number in a storage unit of the portable telephone (T5). In this manner, terminal A can notify the server 1 of the program identification number when terminal A next accesses the server 1. After the server 1 issues the program identification number in step T4, the server 1 conducts program identification number match verification (T6).

Step T6 corresponds to the processing of step S7 in FIG. 5. Here, because the program identification number has been newly issued and there is no "program identification number received together with the use request signal," the determination in step S7 of FIG. 5 automatically becomes negative and the processing proceeds to step S9, and the fact that there is no save data is transmitted to terminal A because in the save data database 43 there is no save data correlated with the member ID received in step T1.

Screen 82 in FIG. 8 is a screen displayed on the information terminal while the server 1 is conducting the processing of steps T2 to T6. The status of progress of the processing is displayed by a scale 52 and a percentage below the scale 52. When the processing is completed, the scale 52 becomes filled in with black and the percentage reaches 100%.

Returning now to FIG. 6, in step T6, terminal A receives the notification that there is no save data, does not download save data from the server 1, and displays a start screen for starting the network game (T7). Screen 83 in FIG. 8 is an example of the start screen displayed in step T7.

In the screen 83 in FIG. 8, the user moves a cursor 53 using the input unit of the information terminal to select "from the beginning" or "continue." When the user selects "from the beginning," the user starts the network game from the beginning. When the user selects "continue," the save data is read and the user resumes playing the network game from where the user had previously left off.

Screen 84 in FIG. 8 is an example of a screen displayed when the user plays "Avatar of A." An image of the upper half of the character that the user has selected at the present time is displayed in a box 54 at the upper left side of the screen 84 in FIG. 8. Of course, the avatar game is a game that can be conducted with an image of the entire character.

A menu for changing the settings of the character is displayed at the upper right side of the screen 84 in FIG. 8. Here, by selecting menu "1," the user can add parts. For example, the user can add glasses to a character not wearing glasses, or add a necktie. By selecting menu "2," the user can change the parts. For example, the user can change straight eyes to round eyes. The selection of the menu is done by inputting a number 55 via the input unit of the information terminal.

A list of certain parts is displayed in the lower portion of the screen 84. When all of the parts cannot be displayed on one screen, buttons 56 and 57 for scrolling are displayed, and parts on the previous page or the next page are displayed when these buttons are clicked via the input unit of the information terminal. In the screen 84 of FIG. 8, a candidate is displayed in an instance where glasses, which are an accessory part, are selected. The user can move a cursor 58 via the input unit of the information terminal to select and enter a desired part.

Among the accessory parts are premium items that cost money and cannot be used unless the user purchases them. These premium items are not displayed on the information terminal and cannot be selected unless authentication of the billing of the user has been completed and purchase is settled.

Returning now to FIG. 6, after the game has begun, terminal A transmits a save request signal (T8). At the same time that terminal A transmits the save request signal to the server 1, it also saves the save data in its own storage unit. This is because when the user does not change information terminals, the information terminal can use the save data saved in its own storage unit without downloading the save data from the server 1.

In step T8, the transmission of the save request signal is conducted manually by the user. Screen 91 in FIG. 9 represents an example of a menu screen that is called up in the avatar game. A case will be described where the user uses the screen 91 to expressly transmit the save request signal.

The screen 91 is a menu screen displayed in a manner covering the screen 84 that is the game screen when the user changes the settings relating to the game, transmits a save request signal, or ends the game. In step T8, the user clicks a button 62 via the input unit of the information terminal, whereby the save request signal is transmitted to the server 1. Information for restoring the character that the user has set (information identifying the selected parts), and information identifying premium items that the user has purchased, is included in the save data transmitted at this time.

Returning now to FIG. 6, when the user clicks the button 62 on the screen 91 in step T8, terminal A transmits the save request signal, the member ID and the save data to the server 1. When the server 1 receives the save request signal, the server 1 correlates the save data with the member ID and stores the save data in the save data database 43 (T9). Step T9 corresponds to the processing of step S13 in FIG. 5. After saving the save data, the server 1 transmits a save completion notification to terminal A.

Then, the user ends the game (T10). The user ends the game by selecting button 63 on the screen 91. In this manner, the first time the user plays the game ends. Next, a case will be described where the game is started a second time.

In FIG. 6, the user again starts application Q stored in terminal A (T11). The second time the application is started, terminal A transmits the member ID of the user and the program identification number. When application Q is started, the server 1 conducts member verification on the basis of the member ID (T12). Here, the user is a registered member and use is allowed.

Next, the server 1 verifies whether a program identification number has been received together with the use request signal (T13). Because this is the second time the application has been started and the program identification number is received in step T11, the server 1 conducts program identification number match verification without issuing a new program identification number (T14). Here, the program identification number stored in the program identification number database 42 matches the program identification number received when the application is started the second time (a new program identification number is not issued and the save data is not transmitted, so the program identification number initially issued with respect to application Q is stored in the program identification number database 42). Thus, the server 1 transmits a match notification to terminal A.

Terminal A receives the match notification of step T14 and displays the start screen for starting the network game without downloading the save data from the server 1 (T15). In the screen 83 in FIG. 8, if the user selects "from the beginning," terminal A begins "Avatar of A" from the beginning without relation to how far the user had played up to, and if the user selects "continue," terminal A reads the save data stored in terminal A in step T8 the first time the application was started and resumes the network game from where the user had previously left off.

When the user clicks the button 62 on the screen 91 after the game has begun, terminal A transmits save data to the server 1 together with the member ID (T16). At the same time that terminal A transmits the save request signal to the server 1, it also stores the save data in its own storage unit. When the server 1 receives the save request signal, the server 1 correlates the save data with the member ID and saves the save data in the save data database 43 (T17). After saving the save data, the server 1 transmits a save completion notification to terminal A.

Then, the user ends the game (T18). The user ends the game by selecting the button 63 on the screen 91. In this manner, the second time the game is played ends. Here, it will be assumed that the user changes information terminals and plays "Avatar of A" on terminal B and not on terminal A. The program for executing "Avatar of A" stored in terminal B will be called application R below.

Moving now to FIG. 7, the user starts application R stored in terminal B (T19). Because this is the first time that the application has been started on terminal B and a program identification number has not been issued with respect to application R, terminal B transmits only the member ID of the user. The same member ID is transmitted to the server 1 even through the user has changed information terminals. When application R is started, the server conducts member verification on the basis of the member ID (T20). Here, the user is a registered member and use is allowed.

Next, the server 1 verifies whether a program identification number has been received together with the use request signal (T21). Because this is the first time the application has been started and only the member ID is transmitted in step T19, here, the server 1 issues a program identification number, correlates the program identification number with the member ID, and stores these in the program identification number database 42 (T22). The program identification number issued in step T22 is transmitted to terminal B, and terminal B stores the transmitted program identification number in the storage unit of the portable telephone (T23).

After the server 1 issues the program identification number in step T22, the server 1 conducts program identification number match verification (T24). Here, the program identification number stored in the program identification number database 42 (the program identification number newly issued with respect to application R) does not match the program identification number received at the time of startup (because a program identification number was not received at the time of startup).

Step T24 corresponds to the processing of step S7 in FIG. 5. Here, because a program identification number is newly issued and there is no "program identification number received together with the use request signal," the determination in step S7 in FIG. 5 automatically becomes negative, the processing proceeds to step S9, and it is verified whether there is, in the save data database 43, save data correlated with the member ID received the first time terminal B is started.

Then, because the save data that was saved the second time terminal A was started previously used by the user is stored in the server 1 (step T17 in FIG. 6), the server 1 displays a verification screen asking the user if the user wants the save data to be transmitted to terminal B (T25). Screen 92 in FIG. 9 is an example of the verification screen displayed in step T25. If the user clicks a "Yes" button 64, then the server 1 transmits the save data to terminal B, and if the user clicks a "No" button 65, then the server 1 does not transmit the save data.

Returning now to FIG. 7, when terminal B receives the save data from the server 1, terminal B stores the save data in its own storage unit (T26). When terminal B stores the save data, terminal B displays the start screen for starting the network game (T27). In the screen 83 in FIG. 8, if the user selects "from the beginning," terminal B begins "Avatar of A" from the beginning without relation to how far the user had played up to, and if the user selects "continue," terminal B reads the save data in step T26 and resumes the network game from where the user had previously left off.

When the user clicks the button 62 on the screen 91 after the game has begun, terminal B transmits save data to the server 1 together with the member ID (T28). At the same time that terminal B transmits the save request signal to the server 1, it also stores the save data in its own storage unit. When the server 1 receives the save request signal, the server 1 correlates the save data with the member ID and saves the save data in the save data database 43 (T29). After saving the save data, the server 1 transmits a save completion notification to terminal B.

Then, the user ends the game (T30). The user ends the game by selecting the button 63 on the screen 91. In this manner, the first time the game is played on terminal B ends.

The following processing is the same as the processing of the second time on terminal A when the user uses an information terminal in which is stored an application program for which a program identification number has already been issued (processing block BLK2). This is a case where the user continues using terminal B or switches from terminal B to terminal A. Also, when the user uses an information terminal in which is stored an application program for which a program identification number has not been issued, processing that is the same as the processing of the first time in terminal B is conducted (processing block BLK3).

Finally in the first embodiment, an example of the specific configuration of the save data will be described using the aforementioned avatar application program as the network game program.

Figures 10A, 10B, 10C, 10D, 10E:
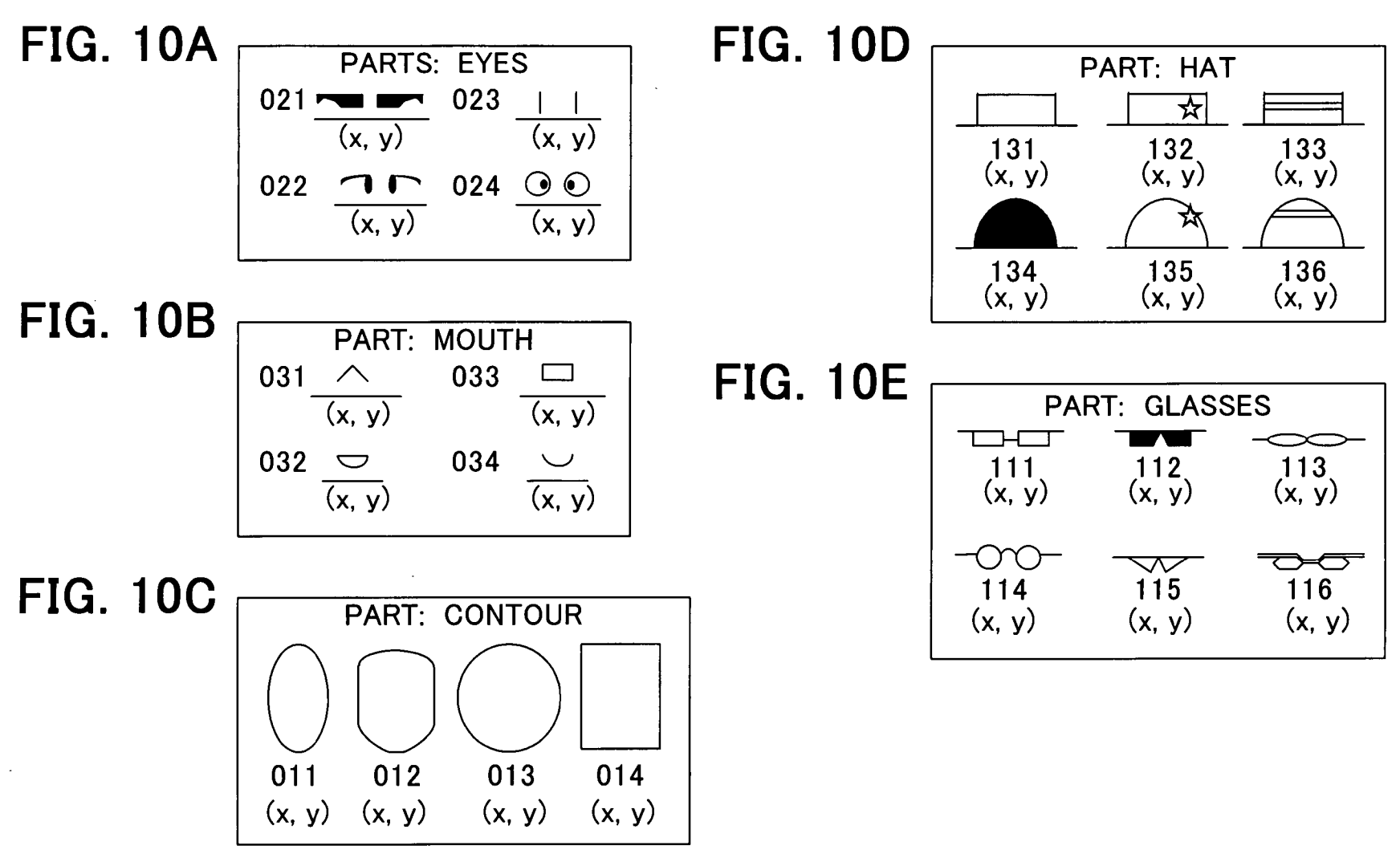

FIGS. 10A to 10E are diagrams showing body parts and accessory parts in the avatar application program. FIG. 10A shows "eye" body parts, FIG. 10B shows "mouth" body parts, FIG. 10C shows "facial contour" body parts, FIG. 10D shows "hat" accessory parts, and FIG. 10E shows "glasses" accessory parts.

Each of the parts is expressed by image data of various graphics, and these are displayed on the display unit of the information terminal. The groups of numbers in the parentheses are coordinate information for identifying display positions. 3-digit numbers are correlated with each set of image data. These are parts numbers for identifying the parts. In this manner, image data for display, display coordinate information of this data, and parts numbers are correlated with one another and managed.

FIGS. 11A and 11B are diagrams showing examples of the configuration of the save data. FIG. 11A shows character configuration information for restoring the character that the user has set, and FIG. 11B shows purchase item information identifying parts among the premium items that the user has purchased. In the character configuration information in FIG. 11A, the parts of the character that the user has set are identified by the parts numbers. In the purchase item information in FIG. 11B, the parts that the user has purchased are identified by the parts numbers.

As long as the parts numbers included in the save data are identified, the image data and display positions thereof can be restored by the application program. Thus, the content at the time of termination can be restored by displaying the corresponding parts on the basis of the save data.

In this manner, only the necessary items (facial contour, eyes, glasses, etc.) of parts and the parts numbers are stored as the save data. The image data of the character that the user has set is not saved as the save data; thus, the amount of data handled can be reduced because the data is saved as text data. This leads to reductions in the communication charge, communication amount, and communication burden between the server 1 and the information terminals. The capacity necessary for storing the save data in the server 1 can be reduced, and the information system can be designed compactly. There is also the advantage that the overall processing becomes lighter.

In the first embodiment, the server 1 was configured to issue a program identification number if a program identification number did not accompany the use request signal when the use request signal was received, but the server 1 may also be configured to issue a program identification number if a program identification number does not accompany the save request signal when the save request signal is received. Also, in the flowchart of FIGS. 6 and 7, the save request signal was transmitted manually by the user, but the save request signal may also be automatically transmitted as a result of the information terminal executing the game program periodically transmitting the save request signal to the server 1.

According to the first embodiment described above, when the user changes terminals, save data for appropriately restoring the game from where the user had left off is downloaded from the server, but when the user has not changed terminals, the save data stored in that terminal is used and save data is not downloaded from the server. In this manner, a reduction in the communication charge and appropriation of the servicing burden on the network server provider can be realized because the excessive communication that has conventionally occurred does not occur. Also, excessive acquisition of save data conducted during initialization at the time the application program is started is not conducted, and the time needed for initialization can be shortened in comparison to what has conventionally been the case.

In the first embodiment, a program identification number is issued only when the server 1 receives a use request signal not accompanied by a program identification number (NO in step S5 to S6 in FIG. 5). In other words, in the first embodiment, when a program identification number is issued with respect to a certain application program, that program identification number is fixed and used with respect to that application program.

When the program identification number is fixed and used, a problem arises when the application program is copied to another information terminal per program identification number. In other words, because there arise several application programs having the same program identification number, there is the potential for different sets of save data at different stages of progress to be present in a plurality of information terminals and for the save data stored in the server 1 to not always be the most recent save data.

However, in the present invention, rather than fixing and using the program identification number, a different program identification number can also be issued each time the server 1 is accessed. And the aforementioned problem can be eliminated by actively changing and issuing program identification numbers. In a second embodiment of the present invention, a case will be described where the server issues a different program identification number each time the server receives a save request signal.

Second Embodiment

The information system in the second embodiment uses the information system of FIG. 1. Also, the server 1 and the information terminals 101 to 104 included in the second information system have the same configuration as shown in FIG. 2.

Figure 12:
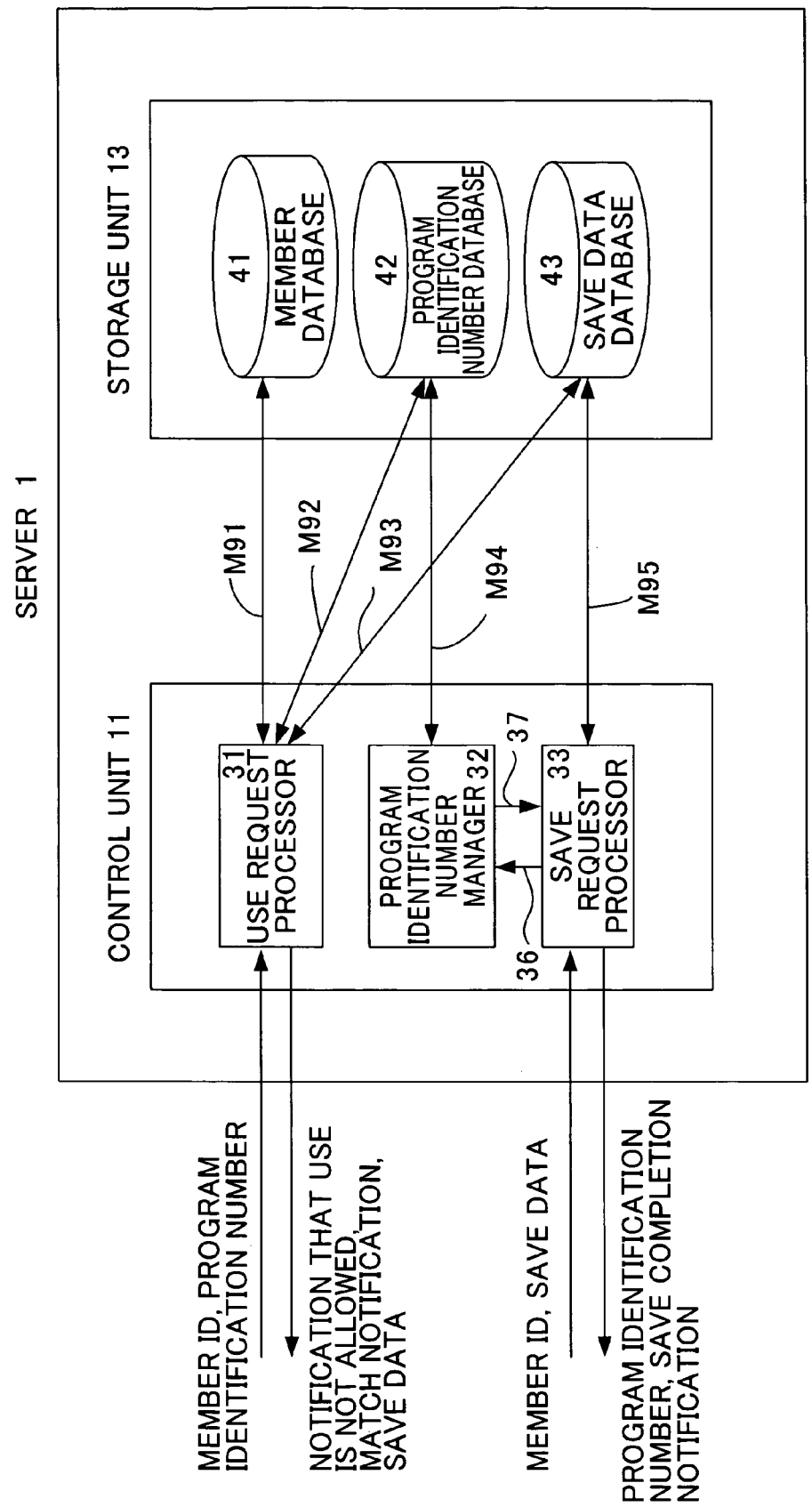
FIG. 12 is a functional block diagram describing a control unit in a server in a second embodiment of the present invention.

FIG. 12 is a functional block diagram describing the control unit 11 in the server 1 of the second embodiment.

The difference between the functional block diagram here and the functional block diagram (FIG. 3) in the first embodiment will be described. In the first embodiment, when a program identification number has not been issued with respect to the application program stored in an information terminal transmitting a use request signal, the use request signal processor 31 outputs the number issuance command 34, whereby the program identification number manager 32 generates a program identification number. In the second embodiment, a new program number is issued when the server 1 receives a save request signal, regardless of the state of issuance of the program identification number, and the server 1 actively changes and manages the program identification number of the application program.

When the save request signal processor 33 receives the save request signal, it outputs a number issuance command 36, and the member ID received together with the save request signal, to the program identification number manager 32. When the number issuance command 36 is inputted, the program identification number manager 32 generates a program identification number (37) so that different numbers are given to the network game programs stored in the information terminals, correlates the program identification number with the inputted member ID, and stores these in the program identification number database 42 (M94). Then, the program identification number manager 32 outputs the generated program identification number 37 to the save request signal processor 33. The save request signal processor 33 transmits the generated program identification number to the information terminal transmitting the save request signal.

In the second embodiment, the use request signal processor 31 does not output the number issuance command even when a program identification number is not received together with the use request signal. Thus, when the use request signal processor 31 receives the use request signal, it references the program identification number database 42 to conduct a match determination (M92).

In the second embodiment, the program identification number database 42 is updated when the use request signal processor 31 transmits save data or receives a save request signal. In this manner, in the program identification number database 42 of the second embodiment, the program identification number correlated with a certain member ID is a program identification number when the server last transmitted the save data to the information terminal used by the user corresponding to that member ID, or a program identification number when the server last received the save request signal. Excluding the above points, the control unit 11 in the server 1 in the second embodiment is no different from that of the first embodiment.

Figure 13:
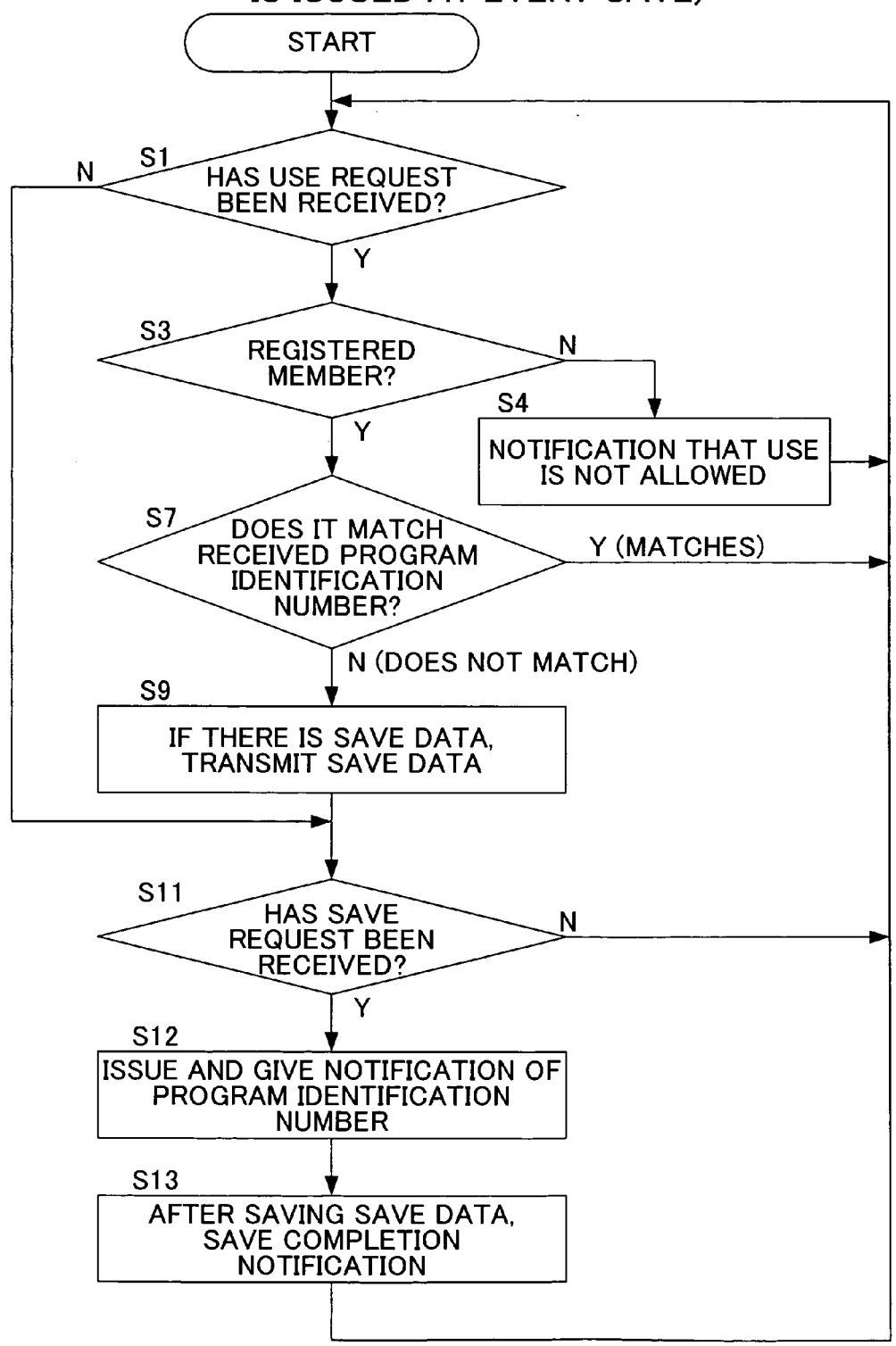
FIG. 13 is a flow chart describing the operation of the server in the second embodiment.

FIG. 13 is a flow chart describing the operation of the server 1 in the second embodiment. The second embodiment is different from the first embodiment in that, here, the determination step of step S5 is omitted and the program identification number issuance step of step S6 is moved to processing when the save request signal is received (S12). Description will be omitted when the content of the processing here is the same as that in the first embodiment (FIG. 5).

First, the server 1 determines whether that which has been received is a use request signal or a save request signal (S1). If the received signal is not a use request signal (S1: NO), then the received signal is a save request signal, so the processing proceeds to step S11, where save request signal processing is conducted (described later).

If the received signal is a use request signal (S1: YES), then the server 1 determines whether the user using the information terminal transmitting the use request signal is a registered member who is allowed to play the network game (S3). The use request signal processor 31 references the member database 41 to verify whether the received member ID is stored therein.

If the received ID is not stored in the member database 41 (S3: NO), then the server 1 regards the access as access by a non-member user, the use request signal processor 31 transmits a notification that use is not allowed to the information terminal transmitting the use request signal (S4), and waits for the arrival of a new use request signal or save request signal.

When step S3 ends, the server 1 determines whether the user has changed information terminals on the basis of the program identification number (S7). Thus, the use request signal processor 31 verifies whether the program identification number received together with the use request signal matches the program identification number correlated in the program identification number database 42 with the member ID received together with the use request signal.

If the program identification number received together with the use request signal matches the program identification number correlated in the program identification number database 42 with the member ID received together with the use request signal (S7: YES), then the server 1 waits for the arrival of a new use request signal or save request signal without transmitting save data.

If the program identification number received together with the use request signal does not match the program identification number correlated in the program identification number database 42 with the member ID received together with the use request signal (S7: NO), then the server 1 transmits save data if the user using the information terminal transmitting the use request signal has saved save data in the server 1 in the past (S9).

It will be noted that when a program identification number has not been issued with respect to the application program stored in the information terminal transmitting the use request signal to the server 1, there is no "program identification number received together with the use request signal," so the determination in step S7 automatically becomes negative (S7: NO). However, even in this case, if save data has been saved in the server 1 in the past, then that save data is transmitted. If save data has not been saved in the server 1 in the past, then step S9 is skipped.

When step S9 ends, the server 1 determines whether a save request signal has been received (S11). If a save request signal has not been received (S11: NO), then the server 1 waits for the arrival of a new use request signal or save request signal. If a save request signal has been received (S11: YES), then the server 1 issues a program identification number and notifies the information terminal of that program identification number (S12).

In step S12, first, the save request signal processor 33 outputs, to the program identification number manager 32, the number issuance command 36 and the member ID received together with the save request signal. The program identification number manager 32 generates a new program identification number in response to the number issuance command, correlates the new program identification number with the member ID, saves these in the program identification number database 42, and outputs the generated program identification number 37 to the save request signal processor 33. The save request signal processor 33 transmits the generated program identification number to the information terminal transmitting the save request signal.

When the server 1 finishes issuing the program identification number ends, it correlates, with the member ID, the save data of the user using the information terminal transmitting the save request signal, stores the save data in the server 1, transmits a save completion notification after saving the save data (S13), and waits for the arrival of a new use request signal or save request signal.

Next, an example of the operation of the information system in the second embodiment will be described using a flow chart. A case will be described here where the portable telephone 103 is used as the information terminal, the user begins playing a network game on a certain portable telephone (terminal A), copies the network game program that had been executed on terminal A to another portable telephone (terminal B), and resumes the game on terminal B. It will be assumed that the data used has the configuration shown in FIGS. 4A to 4C.

Figure 14:
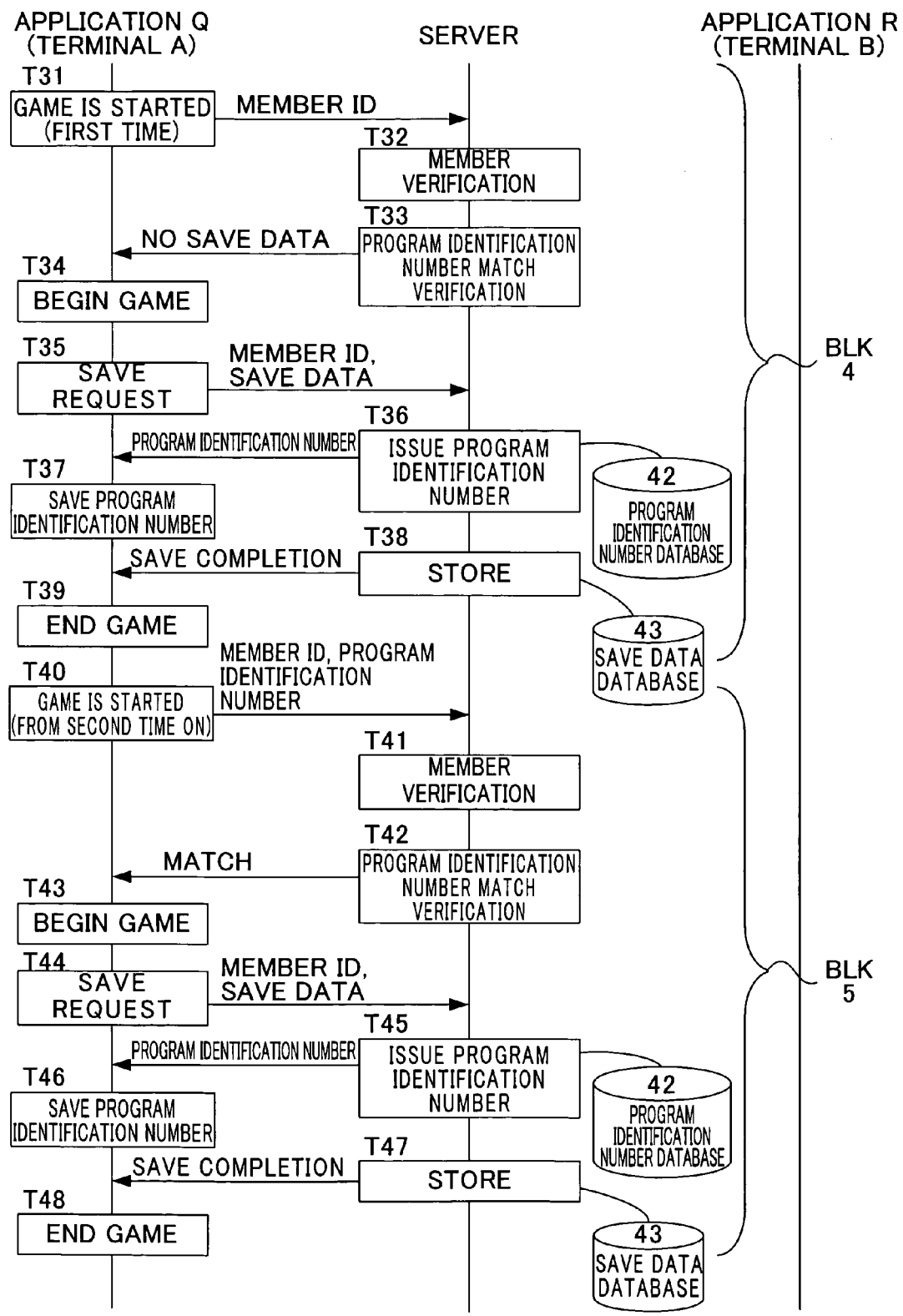
FIG. 14 is a flow chart describing the operation of an information system in the second embodiment.
Figure 15:
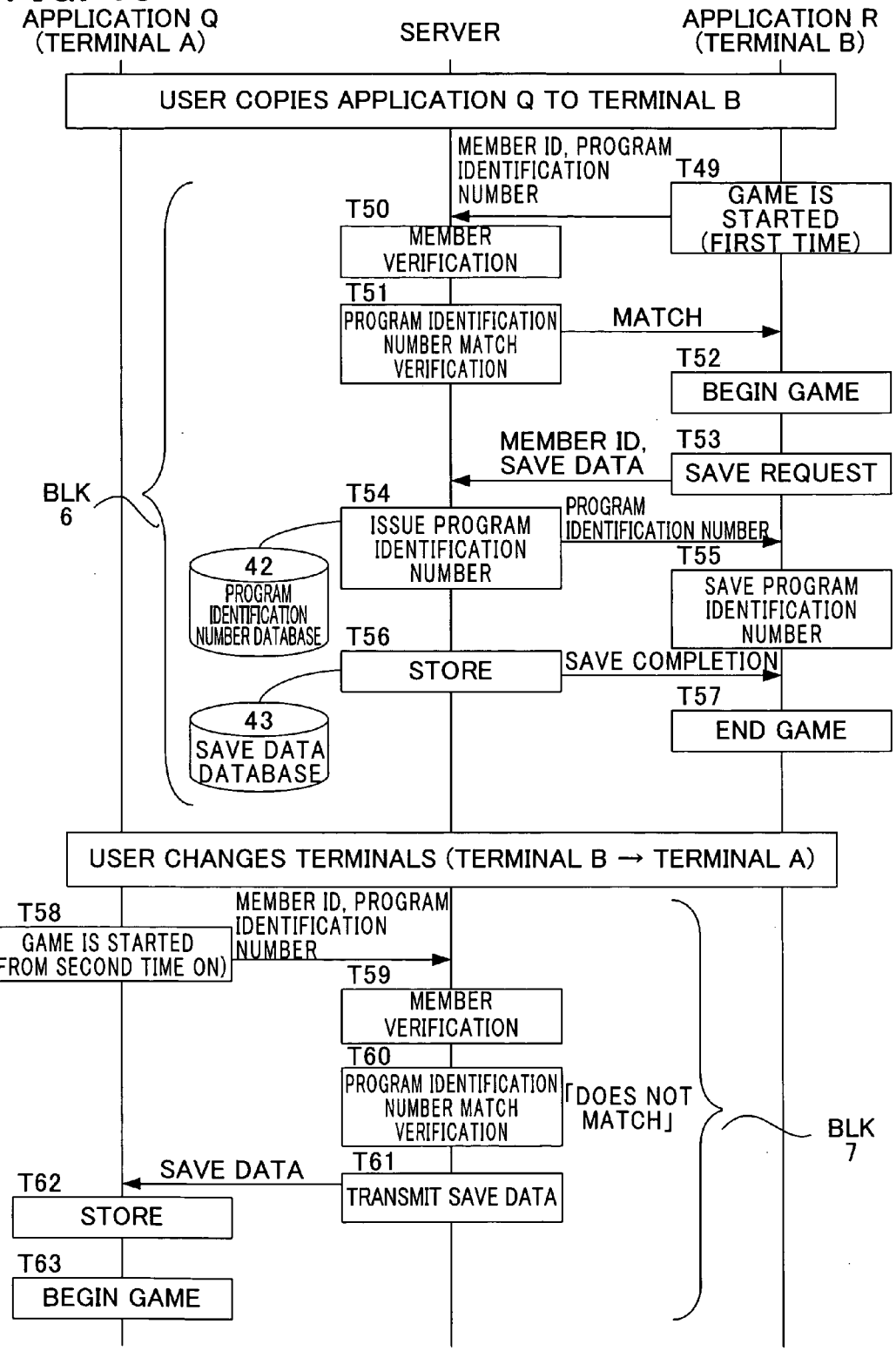
FIG. 15 is a flow chart describing the operation of the information system in the second embodiment.

FIGS. 14 and 15 are a flow chart describing the operation of the information system in the second embodiment. Similar to the first embodiment, it will be assumed that a game called "Avatar of A" is selected as the network game, and the program for executing "Avatar of A" stored in terminal A will be called "application Q" below. Description will be omitted when the content of processing in the steps is the same as that in the first embodiment (FIGS. 6 and 7).

It will be assumed that at the starting point in time in the flow chart, the avatar application program (application Q) for executing the "Avatar of A" is preinstalled in terminal A. First, the user starts the network game program stored in terminal A (T31). This is the first time application Q has been started, and only the member ID is transmitted in step T31 because a program identification number has not been issued with respect to application Q.

When application Q is started, the server 1 conducts member verification on the basis of the member ID (T32). Here, it is assumed that the user is a registered member and use is allowed. Next, the server 1 conducts program identification number match verification (T33). In the second embodiment, in contrast to the first embodiment, "program identification number existence verification" (T3 in FIG. 6) is not conducted.

Step T33 corresponds to the processing of step S7 in FIG. 13. Here, a program identification number is newly issued and the determination in step S7 in FIG. 13 automatically becomes negative, but because save data correlated with the member ID received in step T31 is not present in the save data database 43, the fact that there is no save data is transmitted to terminal A.

Terminal A receives the notification that there is no save data in step T33, does not download save data from the server 1, and displays a start screen for starting the network game (T34). Similar to the first embodiment, the screen 83 in FIG. 8 is displayed, and in response to the selection by the user, the game is started from the beginning or from where the user had left off.

After the game has begun, terminal A transmits a save request signal, the member ID, and save data to the server 1 (T35). The transmission of the save request signal may be conducted manually by the user using a menu screen such as the screen 91 in FIG. 9, or may be conducted automatically as a result of the information terminal executing the game program periodically transmitting a save request signal to the server 1. At the same time that terminal A transmits the save request signal to the server 1, it also stores the save data its own storage unit.

In the second embodiment, each time the server 1 receives a save request signal, it issues a different program identification number, correlates the program identification number with the member ID transmitted in step T35 to the program identification number database 42, and stores these in the program identification number database 42 (T36). Step T36 corresponds to the processing of step S12 in FIG. 13.

The program identification number issued in step T36 is transmitted to terminal A, and terminal A stores the transmitted program identification number in the storage unit of the portable telephone (T37). When the server 1 finishes issuing the program identification number, it correlates the save data with the member ID and stores the save data in the save data database 43 (T38). After saving the save data, the server 1 transmits a save completion notification to terminal A.

Then, the user ends the game (T39). The user ends the game by selecting button 63 on the screen 91. In this manner, the first time the user plays the game ends. Next, a case will be described where the game is started a second time.

The user again starts application Q stored in terminal A (T40). The second time the application is started, terminal A transmits the member ID of the user and the program identification number. When application Q is started, the server 1 conducts member verification on the basis of the member ID (T41). Here, the user is a registered member and use is allowed.

Next, the server 1 conducts program identification number match verification (T42). Here, the program identification number stored in the program identification number database 42 matches the program identification number received when the application was started the second time (the save data is not transmitted and a save request signal is not received, so the program identification number initially issued with respect to application Q is stored in the program identification number database 42). Thus, the server 1 transmits a match notification to terminal A.

Terminal A receives the match notification of step T42 and displays the start screen for starting the network game without downloading save data from the server 1 (T43). Similar to the first embodiment, the screen 83 in FIG. 8 is displayed, and in accordance with the selection of the user, the game is started from the beginning or from where the user had left off.

After the game has begun, terminal A transmits a save request signal (T44). In step T44, terminal A transmits save data to the server 1 together with the member ID. When the server 1 receives the save request signal, it issues a program identification number, correlates the program identification number with the member ID transmitted in step T44 to the program identification number database 42, and stores these in the program identification number database 42 (T45).

The program identification number issued in step T45 is transmitted to terminal A, and terminal A stores the transmitted program identification number in the storage unit of the portable telephone (T46). When the server 1 finishes issuing the program identification number, it correlates the save data with the member ID and stores the save data in the save data database 43 (T47) After saving the save data, the server 1 transmits a save completion notification to terminal A.

Then, the user ends the game (T48). The user ends the game by selecting the button 63 on the screen 91. In this manner, the second time the game is played ends. Here, it will be assumed that the user copies application Q that had been executed on terminal A to another portable telephone (terminal B), and executes application Q on terminal B. In this case, a program identification number has already been issued to application Q, and the issued program identification number is also copied to terminal B when application Q is copied to terminal B.

Moving now to FIG. 15, the user starts application Q stored in terminal B (T49). When application Q is copied to terminal B, the program identification number that was already issued to application Q on terminal A is copied to terminal B. Thus, although this is the first time application Q will be started on terminal B, terminal B transmits the member ID of the user and the program identification number. The same member ID is transmitted to the server 1 even if the user changes information terminals.

When application Q is started, the server 1 conducts member verification on the basis of the member ID (T50). Here, the user is a registered member and use is allowed. Next, the server 1 conducts program identification number match verification (T51). Here, the program identification number stored in the program identification number database 42 (the program identification number with respect to application Q newly issued in step T45 at the time of the save request signal) matches the program identification number received at the time of startup (the program identification number received in step T49). Thus, the server 1 transmits a match notification to terminal B.

Terminal B receives the match notification of step T51 and displays the start screen for starting the network game without downloading the save data from the server 1 (T52). Similar to the first embodiment, the screen 83 in FIG. 8 is displayed, and the game is started from the beginning or from where the user left off in accordance with the selection by the user.

After the game has begun, terminal A transmits the save request signal, the member ID and save data to the server 1 (T53) When the server 1 receives the save request signal, it issues a program identification number, correlates the program identification number with the member ID transmitted in step T53 to the program identification number database 42, and stores these in the program identification number database 42 (T54).

The program identification number issued in step T54 is transmitted to terminal B, and terminal B stores the transmitted program identification number in the storage unit of the portable telephone (T55). When the server 1 finishes issuing the program identification number, it correlates the save data with the member ID and stores the save data in the save data database 43 (T56). After saving the save data, the server 1 transmits a save completion notification to terminal B.

Then, the user ends the game (T57). The user ends the game by selecting the button 63 on the screen 91. In this manner, the first time the game is played on terminal B game ends. Thereafter, if the user continues using terminal B, which is the terminal to which application Q has been copied, the same processing (processing block BLK5) as the processing of the second time on terminal A is conducted.

Here, it will be assumed that the user changes terminals and again plays "Avatar of A" on terminal A and not terminal B. The user again starts application Q stored in terminal A (T58) This is the second time application Q has been started on terminal A, and terminal A transmits the member ID of the user and the program identification number. When application Q is started, the server 1 conducts member verification on the basis of the member ID (T59) Here, the user is a registered member and use is allowed.

Next, the server 1 conducts program identification number match verification (T60). Here, the program identification number stored in the program identification number database 42 (the program identification number issued when terminal B, which is the terminal to which application Q was copied, transmitted the save request signal in step T54) does not match the program identification number received in step T59 (the program identification number issued in step T45).

Thus, the server 1 verifies whether the save data correlated with the member ID received at the time terminal A is started is present in the save data database 43. Here, because the save data saved when terminal B previously used by the user was started the first time is saved in the server 1 (step T56 in FIG. 15), the server 1 displays the verification screen asking the user if the user wants the save data to be transmitted to terminal A (T61). Similar to the first embodiment, the screen 92 in FIG. 9 is displayed, and if the user agrees, the server 1 transmits the save data to terminal A, and if the user does not agree, the server 1 does not transmit the save data.

Then, when terminal A receives the save data from the server 1, it stores the save data in its own storage unit (T62). When terminal A stores the save data, it displays the start screen for starting the network game (T63). Thereafter, processing (processing block BLK5) that is the same as the processing of the second time on terminal A is conducted.

The following processing is the same (processing block BLK6) as the processing of the first time on terminal B when application Q is copied to a new information terminal and the user uses that information terminal. When the user changes information terminals, processing (processing block BLK7) that is the same as the processing after changing from terminal B to terminal A is conducted.

In the second embodiment, the program identification number is issued when the save request signal was received, but the present invention may also be configured so the server 1 issues a program identification number each time the server 1 receives a use request signal.

In the second embodiment described above, effects that are the same as those of the first embodiment can also be obtained. Namely, advantages such as a reduction in the communication charge, appropriation of the servicing burden on the network server provider, and a shortening of the time necessary for initialization can be obtained because the excessive communication that has conventionally occurred does not occur. Also, according to the second embodiment, because the program identification number is not fixed and changes with each save request signal, the save data of the user can be appropriately managed even if the application program is copied to another information terminal per program identification number.

In this specification, for ease of description, portable telephone numbers were used as the member IDs, but user identifiers corresponding to portable telephone numbers on a 1:1 basis can also be used as the member IDs. For example, each mobile telephone company may provide, with respect to online contents holders, user identifiers where portable telephone numbers are converted to strings in accordance with a set rule. The portable telephone number "090-0000-0000" is converted to a user identifier of a string such as "abcdefg89ab" so that the user can be identified by this user identifier (i.e., can be used as the member ID).

While illustrative and presently preferred embodiments of the present invention have been described in detail herein, it is to be understood that the inventive concepts may be otherwise variously embodied and employed and that the appended claims are intended to be construed to include such variations except insofar as limited by the prior art.

What is claimed is:

1. A server comprising:
   a processor
   a communication unit configured to be connected to a plurality of user terminals via a network;
   a control unit configured to process connection requests transmitted from an application program installed on at least one of said user terminals when the application program is started, the connection requests comprising at least a member identifier identifying a user of the application program and a program identification number uniquely identifying the application program installation on the user terminal making the request; and
   a database configured to store member identifiers, program identification numbers, and status data that is indicative of status at which a user associated with a given member identifier has stopped the execution of the application program, wherein the member identifiers, program identification numbers and the status data are stored in the database in connection with said application program,
   the control unit being further configured to:
   (a) determine, when a connection request is received, if the program identification number and member identifier transmitted from the user terminal are stored in the database in connection with said application program;
   (b-1) transmit a command to the user terminal to resume execution of said application program without transmitting the status data stored in the database to the user terminal if the result of step (a) is that the program identification number and the member identifier are stored in the database;
   (b-2) transmit a command to the user terminal to resume execution of said application program with the status data stored in the database if the result of step (a) is that the program identification number is not stored in the database but the member identifier is; and
   (c) update the status data stored in the database for the user associated with the member identifier transmitted from the user terminal based on current status data transmitted from the user terminal upon stopping the execution of the application program on the user terminal.

2. The server according to claim 1,
   wherein step (b-1) is performed when the user terminal is the same one as was operated by the user when the user stopped the execution of the application program, and
   wherein step (b-2) is performed when another user terminal, which is currently operated by the user to be identified by said member identifier but different from the one operated by the user when the user stopped the execution of the application program.

3. The server of claim 2, wherein when the application program installed on a user terminal sends a first connection request, the control unit is further configured to:
   generate a new program identification number;
   store the generated program identification number in the database in association with the member identifier, and
   transmit the generated program identification number to said another terminal, when said another terminal has made a connection to the server.

4. The server of claim 3, wherein generating the new program identification number comprises incorporating the member identifier of the user currently using the application program and a timestamp.

5. The server of claim 1, wherein the database further contains billing information indicating whether a user associated with a given member identifier is authorized to use the application program.

6. The server of claim 5, wherein the control unit is further configured to determine, when a connection request is received, whether the billing information indicates the user associated with the member identifier transmitted from the user terminal is authorized to resume execution of the application program.

7. An information providing method executable on a server comprising a communication unit configured to be connected to a plurality of user terminals via a network; a control unit configured to process connection requests transmitted from an application program installed on at least one of said user terminals when the application program is started, the connection requests comprising at least a member identifier identifying a user of the application program and a program identification number uniquely identifying the application program installation on the user terminal making the request; and a database configured to store member identifiers, program identification numbers, and status data that is indicative of status at which a user associated with a given member identifier has stopped the execution of the application program, wherein the member identifiers, program identification numbers and the status data are stored in the database in connection with said application program,
   the method further comprising:
   (a) determining, when a connection request is received, if the program identification number and member identifier transmitted from the user terminal are stored in the database in connection with said application program;
   (b-1) transmitting a command to allow the user terminal to resume execution of said application program without transmitting the status data stored in the database to the user terminal if the result of step (a) is that the program identification number and the member identifier are stored in the database;
   (b-2) transmitting a command to allow the user terminal to resume execution of said application program with the status data stored in the database if the result of step (a) is that the program identification number is not stored in the database but the member identifier is; and
   (c) updating the status data stored in the database for the user associated with the member identifier transmitted from the user terminal based on current status data transmitted from the user terminal upon stopping the execution of the application program on the user terminal.

8. The method according to claim 7,
   wherein step (b-1) is performed when the user terminal is the same one as was operated by the user when the user stopped the execution of the application program,
   wherein step (b-2) is performed when another user terminal, which is currently operated by the user to be identified by said member identifier but different from the one operated by the user when the user stopped the execution of the application program.

9. The method of claim 8, wherein when the application program installed on a user terminal sends a first connection request, said method further comprises the steps of:
- generating a new program identification number,
- storing the generated program identification number in the database in association with the member identifier; and
- transmitting the generated program identification number to said another terminal.

10. The method of claim 9, wherein generating the new program identification number comprises incorporating the member identifier of the user currently using the application program and a timestamp.

11. The method of claim 7, wherein the database further contains billing information indicating whether a user associated with a given member identifier is authorized to use the application program.

12. The method of claim 11, further comprising determining, when a connection request is received, whether the billing information indicates the user associated with the member identifier transmitted from the user terminal is authorized to resume execution of the application program.

* * * * *